(12) United States Patent
Kondo

(10) Patent No.: US 7,212,711 B2
(45) Date of Patent: May 1, 2007

(54) FIBER OPTIC TRANSCEIVER MODULE AND ELECTRONIC EQUIPMENT

(75) Inventor: Takayuki Kondo, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 110 days.

(21) Appl. No.: 10/814,122

(22) Filed: Apr. 1, 2004

(65) Prior Publication Data

US 2004/0228579 A1    Nov. 18, 2004

(30) Foreign Application Priority Data

Apr. 28, 2003    (JP)    ............ 2003-123560

(51) Int. Cl.
*G02B 6/30*    (2006.01)
*G02B 6/12*    (2006.01)

(52) U.S. Cl. ............ 385/49; 385/14; 385/27; 385/39; 385/50; 385/51; 385/52; 385/88; 385/89; 385/90; 385/92

(58) Field of Classification Search ............ 385/14, 385/27, 39, 50–52, 88–90, 92
See application file for complete search history.

(56) References Cited

U.S. PATENT DOCUMENTS 4,892,374 A * 1/1990 Ackerman et al. ............ 385/49
5,249,245 A    9/1993 Lebby et al.
5,455,703 A * 10/1995 Duncan et al. ............ 398/136
5,726,796 A * 3/1998 Regener et al. ............ 359/341.2
2003/0170965 A1    9/2003 Kondo

FOREIGN PATENT DOCUMENTS

| JP | A 5-243688 | 9/1993 |
| JP | A 11-183747 | 7/1999 |
| JP | A 2001-188150 | 7/2001 |

* cited by examiner

*Primary Examiner*—Frank G. Font
*Assistant Examiner*—Michael P. Mooney
(74) *Attorney, Agent, or Firm*—Oliff & Berridge, PLC

(57) ABSTRACT

A fiber optic module is provided that effectively reduces a returned light and is manufactured by a low time and cost consuming process and electronic equipment. The fiber optic transceiver module includes a block that includes an optical waveguide and a guide that is provided to one end of the optical waveguide and is a concave portion into which an optical fiber is inserted, and a micro tile-like element that includes a light emitting element or a light receiving element is attached to the block. A light emitting part of the light emitting element or a light receiving part of the light receiving element is disposed so as to face the other end of the optical waveguide. The optical waveguide includes a branch having a blind end.

19 Claims, 21 Drawing Sheets

Fig. 13a
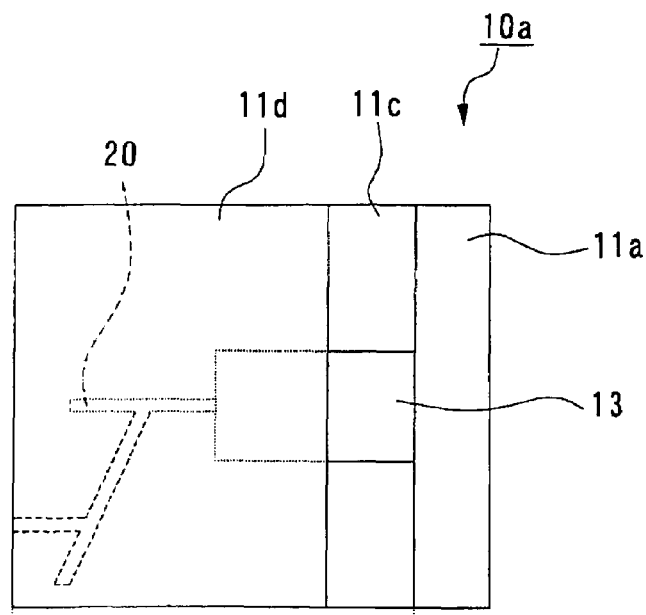
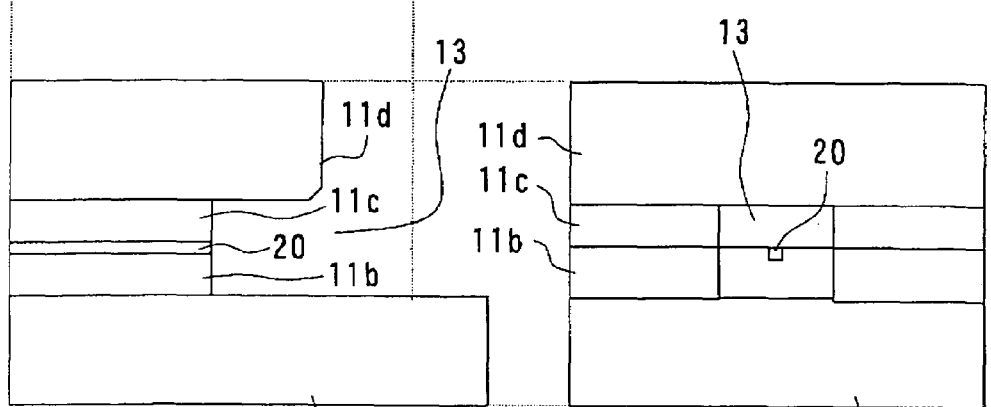
Fig. 13b
Fig. 13c

FIBER OPTIC TRANSCEIVER MODULE AND ELECTRONIC EQUIPMENT

BACKGROUND OF THE INVENTION

1. Field of Invention

The present invention relates to a fiber optic transceiver module to optically couple a light emitting element or a light receiving element and an optical fiber and electronic equipment.

2. Description of Related Art

Optical fibers are used in optical communications systems to transmit laser beams and establishing communications. At the end of each optical fiber, a module for optical communications that includes a light emitting element or a light receiving element is installed. In installing this module, for example, the light emitting element, a lens, and the end of a core of the optical fiber are precisely aligned in three dimensions so as to efficiently lead light emitted from the light emitting element to the core of the optical fiber. See Japanese laid-open patent application No. 5-243688, for example.

The above-mentioned related art module for optical communications requires precise alignment among a light emitting or receiving element, a lens, and the end of a core of an optical fiber, to avoid a condition that each of these elements is out of alignment in three dimensions, thus consuming time and cost to install the module. Specifically, in order to install the module, a light emitting element, a lens, and an optical fiber are roughly aligned first. Then, light is emitted from the light emitting element. Subsequently, the alignment among the light emitting element, the lens, and the end of the optical fiber is finely adjusted in three dimensions so as to have light focused on the lens and directed into the end of the optical fiber.

A back reflection (returned light) at an end of the optical fiber may cause problems in a module for optical communications. The returned light problem will now be described by referring to FIG. 29. A fiber optic transceiver module 200 shown in FIG. 29 includes a block 211 including a optical waveguide 212 and a guide 13 and a light emitting element 201 attached on a side 214 of the block 211. An optical fiber 60 including a core 62 and a clad 61 is inserted into the guide 13. This makes it possible to transmit light emitted by the light emitting element 201 through the optical waveguide 212 to enter the core 62 of the optical fiber 60.

A part of the light emitted by the light emitting element 201 is reflected as a returned light R1 at the end of the optical waveguide 212 and a returned light R2 at the end of the core 62. For example, the light emitting element 201 may be a semiconductor laser (an edge emitting laser or an surface emitting laser). The returned light R1 and R2 enter the semiconductor laser so as to cause an unstable laser oscillation. A reflection mirror at an end of the laser plays a role of a resonator. Hence, if the emitted light returns, this returned light functions as a plurality of resonators so as to fluctuate an oscillation frequency. When using a laser as a light source in optical signal communications, it is always required to minimize the amount of the returned light for stable laser oscillation.

As for a countermeasure for the returned light, a method of filling transparent resin (called potting resin or matching resin), whose refractive index is similar to that of the optical fiber (core), is adopted. However, the method is not able to avoid the returned light effectively in normal surrounding conditions where temperatures vary, because of a temperature dependency of a refractive index of the potting resin. When the potting resin is applied to couple the guide to the optical fiber, a method allowing the block and the optical fiber to couple or decouple conveniently is not applicable. Specifically, the application is limited.

Alternatively, a method to cut the end of the optical fiber at an angle was introduced. The method, however, is also not able to cope with the returned light reflected from a part excluding the end of the optical fiber (for example, the end of the optical waveguide) and further the processing of the end of the optical fiber is expensive.

SUMMARY OF THE INVENTION

In consideration of the above-mentioned problem, the invention provides a fiber optic transceiver module that effectively reduces the returned light and is manufactured with simple and inexpensive process, and electronic equipment.

In order to achieve the above aim, a fiber optic transceiver module of an aspect of the invention includes a block that includes an optical waveguide and a concave formed guide into which an optical fiber is inserted and provided to at least one end of the optical waveguide and an optical element with a light emitting or receiving surface that is attached to the block. The light emitting or receiving surface is disposed so as to face the other end of the optical waveguide. The optical waveguide includes a branch having a blind end.

According to an aspect of the invention, it is possible to fix an end of the optical fiber to a predetermined position of the block only by inserting the end of the optical fiber into the guide included in the block. The other end of the optical waveguide included in the block is at a side or a bottom of the guide. Therefore, it is possible to have the other end of the optical waveguide facing the end of the core of the optical fiber inserted into the guide. Consequently, it is possible to optically couple the core of the optical fiber and the optical waveguide included in the block only by inserting the end of the optical fiber into the guide. Also, as a light emitting or receiving device of the tile-like element and the like attached to the block faces the other end of the optical waveguide, the light emitting or receiving device is optically coupled with the optical waveguide. This makes it possible to optically couple the light emitting or receiving device and the optical fiber only by inserting an end of the optical fiber into the guide. Also, by employing the tile-like element and the like to the light emitting or receiving device, it is possible to provide a fiber optic transceiver module that is significantly compact in size.

Further in an aspect of the invention, since the optical waveguide includes the branch having the blind end, for example, even though the light emitted from the light emitting device enters the optical waveguide and is reflected off the end of the optical waveguide or the end of the optical fiber, this makes it possible to lead the light reflected to the blind end. The blind end reduces or prevents the light reflected from being returned back to the light emitting device (so-called returned light).

Therefore, according to an aspect of the invention, even a semiconductor laser and the like is applied for the light emitting device, it is possible to reduce or prevent the semiconductor laser from the fluctuation of oscillation frequency or unstable oscillation.

As in the related art, a method may be adopted that reduces the returned light by filling potting resin between the end of the optical waveguide and the end of the optical fiber so as to lessen refractive index differences between materials forming optical transmitting paths. However, the method is not capable of avoiding the returned light effectively in a normal surrounding condition where temperatures vary, because of the temperature dependency of refractive index of the potting resin. Also, when the potting resin is applied to couple the guide to the optical fiber, the application is limited because the method that allows the block and the optical fiber to couple or decouple conveniently is not applicable. As an alternative, a method that the end of the optical fiber is cut at an angle so as to reduce the returned light is adopted. The method is also not able to cope with the returned light reflected from the end of the optical waveguide and is cost consuming in the processing of the end of the optical fiber.

However, in an aspect of the invention, by employing the blind end in the optical waveguide, it is possible to avoid the returned light effectively and economically in surrounding conditions where temperatures vary without applying the potting resin or cutting of the end of the optical fiber.

In the fiber optic transceiver module of an aspect of the invention, the optical element may be employed in a tile-like element.

This makes it possible to provide the fiber optic transceiver module that is significantly compact in size.

Also, in the fiber optic transceiver module of an aspect of the invention, the optical element may be flip-chip mounted on the block.

This makes it possible to provide a gap among the light emitting and receiving device and the block when the light emitting and receiving device are mounted on the block. Therefore, it is possible to reduce or prevent the optical element from being damaged resulting from such mounting process.

Also, in the fiber optic transceiver module of an aspect of the invention, the optical element may be an optical fiber.

This makes it possible to easily couple together the optical fibers without the returned light.

Also, in the fiber optic transceiver module of an aspect of the invention, the light emitting device may be a surface emitting laser.

This makes it possible to reduce or prevent the light that is emitted by the surface emitting laser and enters the optical waveguide from entering the surface emitting laser as returned light. Therefore, this makes it possible to stabilize the operation of the surface emitting laser that is the oscillation source of the optical signal, economically providing the fiber optic transceiver module with stable operation.

Also, in the fiber optic transceiver module of an aspect of the invention, the optical waveguide may include a main path extended to the guide from the light emitting device and the branch, the branch being connected to the main path and aligned at an angle of ninety (90) degrees and below with respect to the light source side of the main path.

The optical signal transmitted from the light source passes the main path in the optical waveguide. The main path is connected to the branch at an angle of ninety (90) degrees and below. Therefore, this makes it possible to transmit most of the light (an optical signal) transmitted from the light source (from the tile-like element side or the optical fiber side) to the light receiving side (to the optical fiber side or the tile-like element side). Additionally, when the reflected light occurs at the end of the optical waveguide or the end of the optical fiber, this enables most of the deflected light to lead to the branch. Consequently, it is possible to reduce the returned light while reducing or preventing the deterioration of the optical coupling efficiency.

Also, in the fiber optic transceiver module of an aspect of the invention, the branch may be connected to the main path at an angle of forty five (45) degrees and below, with respect to the path positioned at the light source side of the main path. The angle that the branch makes with the path at the light source side of the main path is forty five (45) degrees and below. Therefore, it is possible to lessen the loss of the optical signal.

Also, in the fiber optic transceiver module of an aspect of the invention, the branch may be provided with two or more paths.

Because each of the branches enable the returned light to reduce, it is possible that the higher the number of the branches, the higher efficiency of the returned light blockage.

Also, in the fiber optic transceiver module of an aspect of the invention, the blind end of the branch may be configured so as to attenuate or absorb the light entering the branch.

The returned light that enters the branch is attenuated or absorbed at the blind end. Therefore, this makes it possible to reduce or prevent the light entering the branch from exiting from the branch, increasing the efficiency of the returned light blockage.

Also, in the fiber optic transceiver module of an aspect of the invention, the blind end of the branch may be shaped to have a tapered edge at the blind end.

Because the blind end of the branch is tapered at the edge, this makes it possible to substantially reduce the ratio of the light exiting from the branch, increasing the efficiency of the returned light blockage.

Also, in the fiber optic transceiver module of an aspect of the invention, an optical absorber may be provided at the edge of the blind end of the branch.

Because the optical absorber is provided at the edge of the blind end of the branch, this makes it possible to substantially reduce the ratio of the light exiting from the branch, increasing the efficiency of the returned light blockage.

Also, in the fiber optic transceiver module of an aspect of the invention, an optical light scattering member may be provided at the edge of the blind end of the branch.

Because the optical light scattering member is provided at the edge of the blind end of the branch, this makes it possible to substantially reduce the ratio of the light exiting from the branch, increasing the efficiency of the returned light blockage.

Also, in the fiber optic transceiver module of an aspect of the invention, the optical waveguide may include a plurality of main forked paths each having one end exposed at the side of the block, each of the plurality of the light emitting devices being allocated to the side of the block so as to face each of the ends of the forked main paths correspondingly, each of the plurality of the light emitting device emitting light of a different wavelength with each other.

While having the so-called multiplexing function, that integrates a plurality of lights having a different wavelength with each other (a plurality of optical signals) into one light in the optical waveguide to enter an optical fiber, it is possible to block the returned light.

Also, in the fiber optic transceiver module of an aspect of the invention, the light receiving device (a photodiode) may be allocated to at least one of the blind end of the optical waveguide.

This makes it possible to optically couple the light emitting device and light receiving device to the optical fiber and also to reduce or prevent the light emitted by the light emitting device from being reached at the light receiving device. Consequently, it is possible to receive and transmit an optical signal simultaneously by using the block including one optical waveguide with one optical fiber.

Also, in the fiber optic transceiver module of an aspect of the invention, the optical waveguide may include a receiving path extended to the guide from the side of the block in the shape of nearly straight line, the receiving device being allocated to the side of the block so as to face the end of the receiving path.

Light traveling from an optical fiber to the block passes through the receiving path to enter the light receiving device. Light emitted from the tile-like element (light emitting element) passes through the optical waveguide to enter the optical fiber. Therefore, it is possible to receive and transmit an optical signal simultaneously by using the block including one optical waveguide with one optical fiber.

Also, in the fiber optic transceiver module of an aspect of the invention, the light receiving device may be a photodiode.

Electronic equipment of an aspect of the invention may include the fiber optic transceiver module.

An aspect of the invention provides electronic equipment that effectively reduces the returned light occurring in and out of the module, stably operates the light emitting element, stably sends and receives optical signals and is compact in size. The invention economically provides electronic equipment that stably sends and receives optical signals and is compact in size.

BRIEF DESCRIPTION OF THE DRAWINGS

FIGS. 13a–13c are schematics showing the fiber optic transceiver module from three directions;

DETAILED DESCRIPTION OF EXEMPLARY EMBODIMENTS

Figure 1:
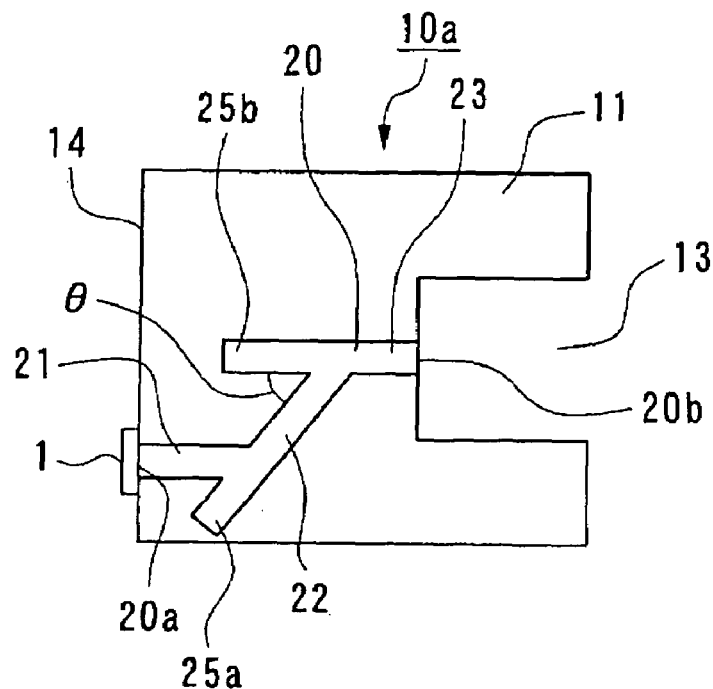
FIG. 1 is a sectional schematic showing a fiber optic transceiver module of a first exemplary embodiment of the invention.

The fiber optic transceiver module according to an aspect of the invention will now be described by referring to the accompanying drawings First Exemplary Embodiment FIG. 1 is a sectional schematic showing a fiber optic transceiver module and an optical fiber that is coupled to the module of a first exemplary embodiment of the invention. A fiber optic transceiver module 10a of this exemplary embodiment includes a block 11 having an optical waveguide 20 and a guide 13, and a micro tile-like element 1 that is directly attached to the side 14 of the block 11.

The micro tile-like element 1 is a minute semiconductor device whose shape is like a tile (plate). It is, for example, square in shape and from 1 to 20 micrometers thickness and from several dozen to several hundred micrometers long and wide. The micro tile-like element 1 may include a light emitting element. A method to manufacture and attach this micro tile-like element will be described in detail later. It should be noted that the shape of the micro tile-like element is not necessarily limited to square and may be formed in other shapes.

Examples of the light emitting element included in the micro tile-like element 1 may include a surface-emitting laser, an edge-emitting laser and LED.

The guide 13 is provided on a side of the block 11 and is a concave portion into which end of an optical fiber is inserted. The guide 13 is provided at one end 20b of the optical waveguide 20 included in the block 11. The position of the guide 13 and the optical waveguide 20 may be adjusted by aligning the center on the bottom of the guide 13 close to the center of the one end 20b of the optical waveguide 20. This enables the optical waveguide 20 and the core of the optical fiber inserted into the guide 13 to be coupled with high optical coupling efficiency.

The optical waveguide 20 is provided so as to penetrate the block 11. The one end 20b of the optical waveguide 20 is exposed close to the center of the bottom of the guide 13 and the other end 20a of the optical waveguide 20 is exposed on the side 14 of the block 11. The micro tile-like element 1 is provided so as to face the other end 20a of the optical waveguide 20.

For example, the position of the micro tile-like element 1 may be adjusted by aligning the center of the light emitting part of the tile-like element 1 to the center of the other end 20a of the optical waveguide 20. This enables the micro tile-like element 1 and the optical waveguide 20 to be coupled with high optical coupling efficiency. If the micro tile-like element 1 includes a light emitting element and the surface of the other end 20a of the optical waveguide 20 overlaps the light emitting part of the light emitting element, the light emitting element and the core 62 of the optical fiber is coupled with high optical coupling efficiency.

The optical waveguide 20 is forked into passages in the block 11 including the branch 25a, 25b that has the blind end. The optical waveguide 20 includes the main path 21, 22, 23 extended to the bottom of the guide 13 from the side facing the micro tile-like element 1 and the branch 25a, 25b that has the blind end. The angle θ that the branch 25a makes with the main path 21 and the branch 25b makes with the main path 22 may be ninety (90) degrees and below. Forty five (45) degrees and below is preferred.

The principal operation of the fiber optic transceiver module 10a as above-mentioned will now be described as follows. The light emitted from the micro tile-like element 1 enters the optical waveguide 20 through the other end 20a of the waveguide 20. The light travels in a direction that is obtuse to the main path 21 at the forked part in the optical waveguide 20. The light is transmitted through the main path 21 in the optical waveguide 20 to enter the main path 22. Since the main path 21 connects and slants off the main path 22, there is no substantial returned light caused by reflecting the light entering the main path 22 from the main path 21 at the side of the main path 22.

Then, the light entering the main path 22 enters the main path 23, transmitting through the main path 22. Since the main path 22 connects and slants off the main path 23, there is no substantial returned light caused by reflecting the light entering the main path 23 from the main path 22 at the side of the main path 22. The light entering the main path 23 is transmitted to the other end 20b of the optical waveguide 20 through the main path 23, then exits and enters the core of the optical fiber (not illustrated) inserted into the guide 13. The light entering the core is transmitted as a transmission signal. The gap between the other end 20b of the optical waveguide 20 and the end of core of the optical fiber is acceptable.

Some of the light transmitted through the main path 23 may reflect off the other end 20b of the optical waveguide 20. Some of the exiting light from the other end 20b of the optical waveguide 20 may reflect off the end of the core of the optical fiber (the end of the core at the side of the fiber optic transceiver module 10a and the end of the core at the opposite side of the fiber optic transceiver module 10a) to return back to the main path 23. Further, the light reflected from the optical element and the like, that is coupled to the end of the core of the optical fiber at the opposite side of the fiber optic transceiver module 10a may return to the main path 23. Most of the reflected light (returned light) as above-described passes back straight along the main path 23. Therefore, most of the reflected light (returned light) passes back along the main path 23 enters the branch 25b. Since the branch 25b includes the blind end, most of the reflected light vanishes at the blind end. If extremely small amounts of reflected light enter the main path 22, it mostly vanishes at the blind end of the branch 25a.

Accordingly, in the fiber optic transceiver module 10a, little light reflected (returned light) from the other end 20b of the optical waveguide 20 and the end of the core of the optical fiber reaches the micro tile-like element 1. In this exemplary embodiment, it is possible to reduce or prevent the semiconductor laser from oscillation frequency fluctuation or unstable oscillation caused by the returned light, even when a semiconductor laser, surface emitting laser and the like, is employed for the micro tile-like element 1.

Figure 2:
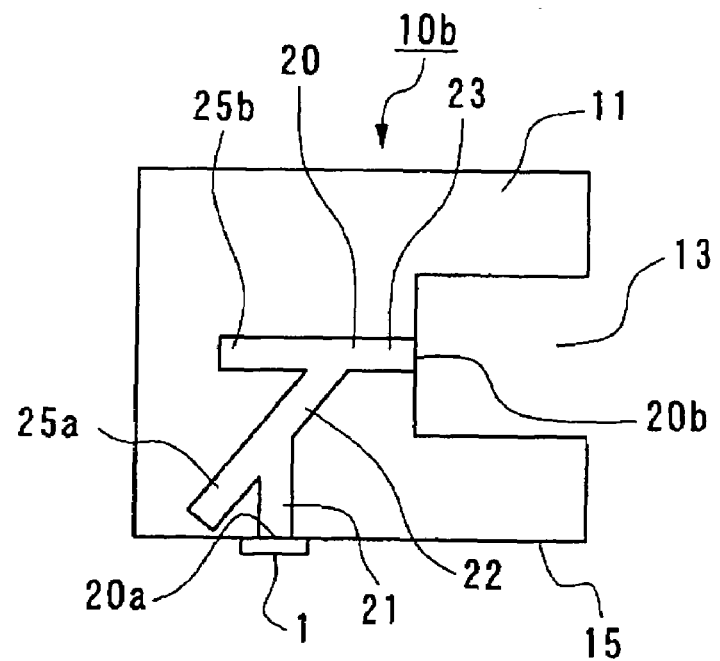
FIG. 2 is a sectional schematic showing a modification of the first exemplary embodiment of the invention.

The light blockage performance in the branch is determined by the angle among the branch and the main path, a width of the optical waveguide and a reflecting condition at a boundary surface and the like. In this exemplary embodiment, even though only one branch includes the blind end, this enables far-reaching performance to carry out the light blockage. Here, employing two or more branches having blind end, 25a, 25b as shown in FIG. 2, may be used for higher light blockage performance.

Employing two and more branches enables a light source to be positioned more freely. FIG. 2 is a sectional schematic showing a modification of fiber optic transceiver module of the first exemplary embodiment of the invention. The difference between the fiber optic transceiver module 10b shown in FIG. 2 and the fiber optic transceiver module 10a shown in FIG. 1, is the position of the micro tile-like element 1 and the main path 21. As for the fiber optic transceiver module 10b, the micro tile-like element 1 is attached to the bottom 15 of the block 11. Here, the micro tile-like element may be attached to the upper surface of the block 11 with the same formation.

Figure 3:
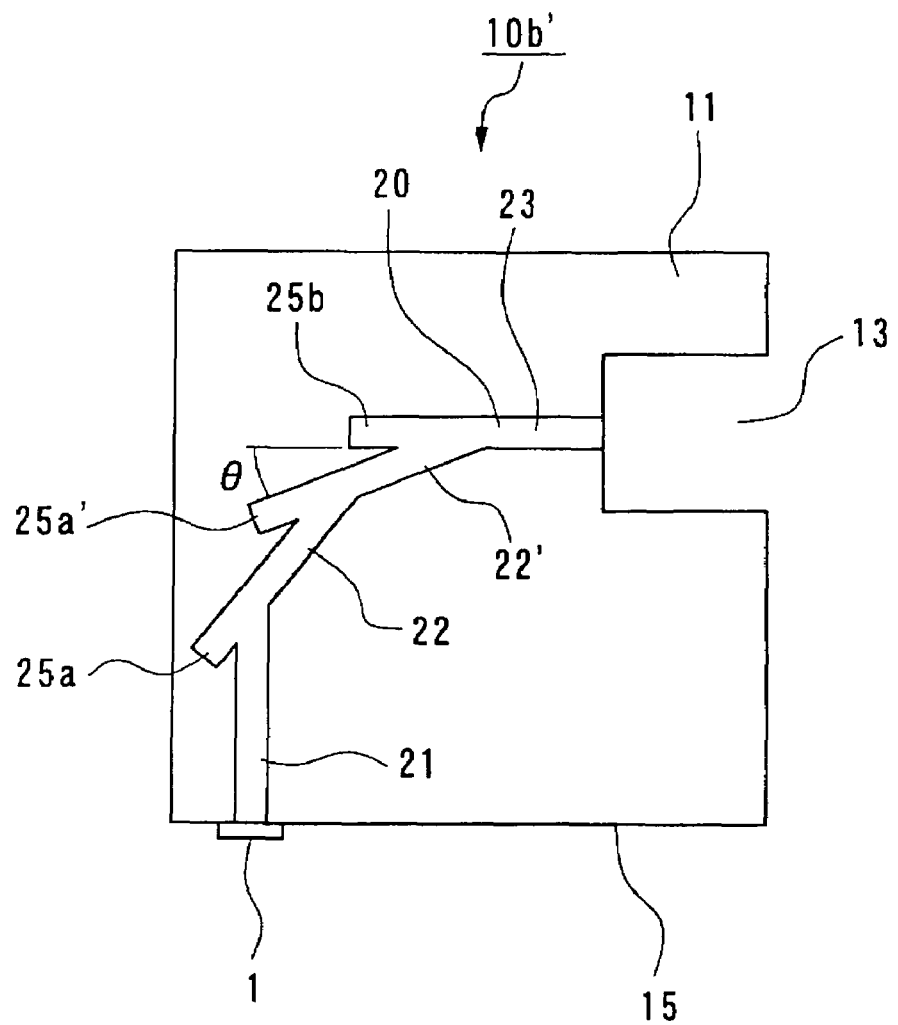
FIG. 3 is a sectional schematic showing another example of the modification of the first exemplary embodiment of the invention.

In the above-mentioned exemplary embodiment, the smaller angle θ of the branch with respect to the main path, the fewer the loss of the transmitting light from the light source (micro tile-like element 1) at the forked part. Here, smaller angle θ causes lower efficiency of light blockage on the returned light passing back along the main path. Therefore, if a smaller angle θ is employed, it is preferable to increase the number of the branches 25a, 25b. FIG. 3 is a sectional view showing a modification of fiber optic transceiver module of the first exemplary embodiment of the invention. Compared to the fiber optic transceiver module 10b shown in FIG. 2, in the fiber optic transceiver module 10b' shown in FIG. 3, the number of branches and main paths is increased, namely branch 25a, 25a' and main path 22, 22'. Also the angle θ of the branch 25a with respect to the main path 22' is decreased. This makes it possible to increase the efficiency of the returned light blockage while maintaining the optical coupling efficiency higher in the optical waveguide.

Second Exemplary Embodiment

Figure 4:
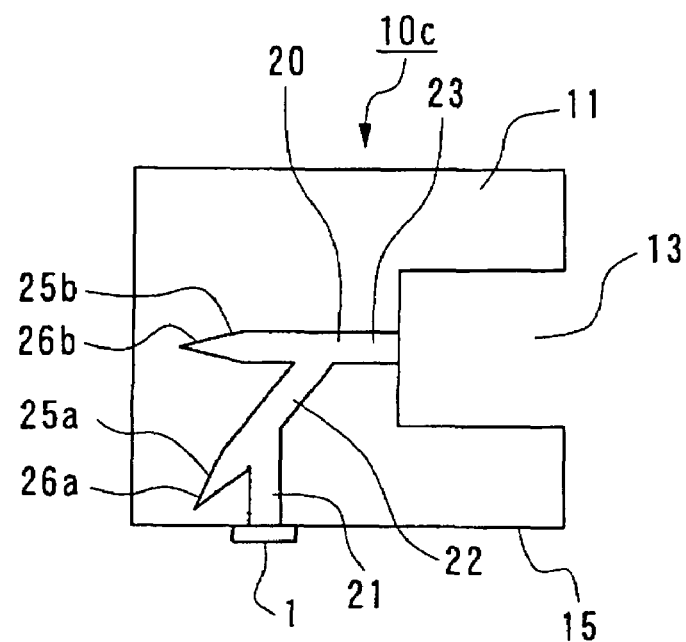
FIG. 4 is a sectional schematic showing another example of a second exemplary embodiment of the invention.

A second exemplary embodiment of the invention will now be described by referring to FIGS. 4 and 5. FIG. 4 is a sectional schematic showing a fiber optic transceiver module 10c of the second exemplary embodiment of the invention. The difference between the fiber optic transceiver module 10c and the fiber optic transceiver module 10a and 10b in the first exemplary embodiment is that the fiber optic transceiver module 10c configures the blind end of the branch 25a, 25b so as to attenuate or absorb the light entered therein.

Immediate attenuation on the returned light entering the blind end of the branch 25a, 25b is required. Because the light reflected off (at the edge of) the blind end of the branch 25a, 25b turns to the returned light to deteriorate the substantial efficiency of the returned light blockage in the branch. Thus, (at the edge of) the blind end 26a, 26b of the respective branch 25a, 25b are tapered in the fiber optic transceiver module 10c. As the result, the light entered the blind end of the branch 25a, 25b is attenuated rapidly in repeated reflection between side walls opposed at an angle.

Figure 5:
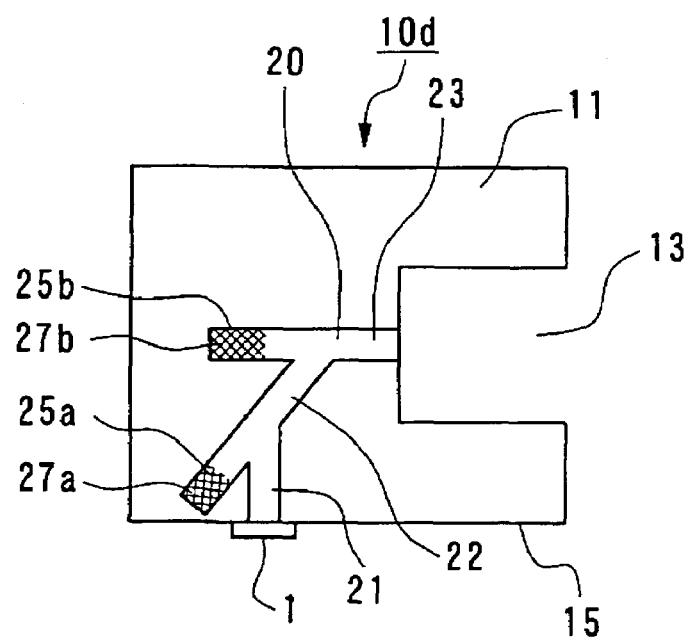
FIG. 5 is a sectional schematic showing a modification of the second exemplary embodiment of the invention.

FIG. 5 is a sectional schematic showing a modification of a fiber optic transceiver module of the second exemplary embodiment of the invention. As for the fiber optic transceiver module 10d shown in FIG. 5, (at the edge of) the blind ends 27a, 27b of the respective branch 25a, 25b are filled with a optical absorber or optical light scattering member. The other formations are the same as the fiber optic transceiver module 10c shown in FIG. 4. This results in the light entering the blind end of the branch 27a, 27b being attenuated rapidly by the optical absorber or optical light scattering member.

Third Exemplary Embodiment

Figure 6:
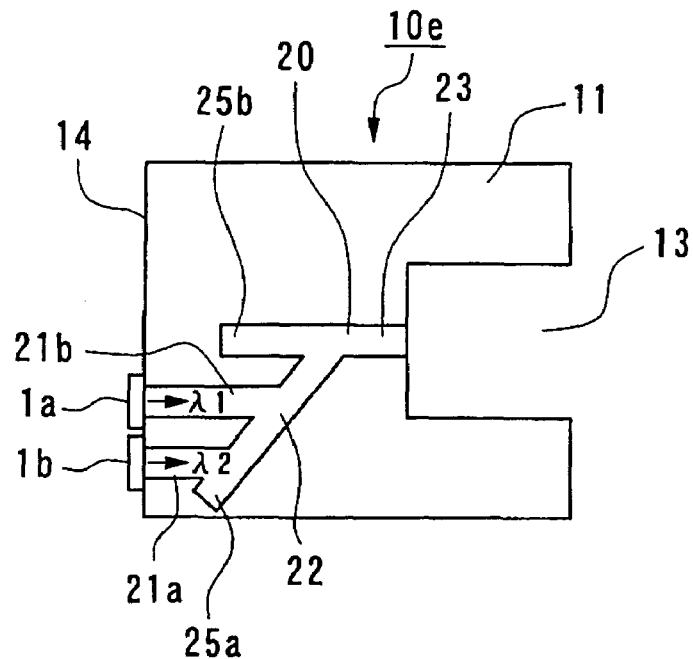
FIG. 6 is a sectional schematic showing a third exemplary embodiment of the invention.

A third exemplary embodiment of the invention will now be described by referring to FIG. 6. FIG. 6 is a sectional schematic showing a fiber optic transceiver module 10e of the third exemplary embodiment of the invention. In the fiber optic transceiver module 10e, the optical waveguide 20 incorporates a plurality of forked main paths 21a, 21b having the other end exposed to the side 14 of the block 11. Furthermore, the micro tile-like elements 1a, 1b are allocated on the side 14 of the block 11 so as to be facing the other end of the forked main path 21a, 21b respectively.

Each of the micro tile-like elements 1a, 1b emit light of different wavelengths from each other. For example, the micro tile-like element 1a emits the light of wavelength λ1 and the micro tile-like element 1b emits the light of wavelength λ2. For the micro tile-like element, a surface emitting laser may be used. The other formations are the same as the fiber optic transceiver module 10a.

As mentioned above, the fiber optic transceiver module 10e in this exemplary embodiment includes the surface emitting lasers that emits light of different wavelengths from each other and are allocated to the forked main path 21a, 21b respectively. Therefore, the fiber optic transceiver module 10e in this exemplary embodiment is capable of satisfying both of the functions. Specifically the so-called multiplexing function, that integrates a plurality of lights (laser beam) of different wavelength each other into one optical fiber and the returned light blockage function.

Fourth Exemplary Embodiment

Figure 7:
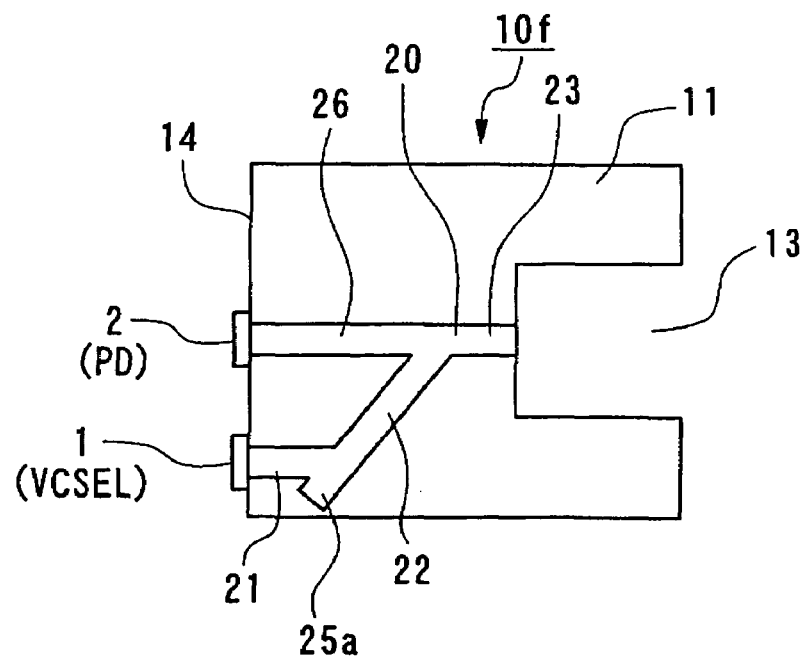
FIG. 7 is a sectional schematic showing a fourth exemplary embodiment of the invention.

A fourth exemplary embodiment of the invention will now be described by referring to FIG. 7. FIG. 7 is a sectional schematic showing a fiber optic transceiver module 10f of the fourth exemplary embodiment of the invention. The fiber optic transceiver module 10f couples the light emitting element and the light receiving element to the one optical fiber, employing the returned light blockage function of the fiber optic transceiver module 10a to 10e in the exemplary embodiments one to three, described above.

As for the fiber optic transceiver module 10f, the micro tile-like element 2 is allocated to the end of the light receiving path 26 that corresponds to the blind end of the branch 25a of the optical waveguide 20 in the fiber optic transceiver module 10a to 10e. The micro tile-like element 2 includes the light receiving element. For the light receiving element, a photodiode may be used.

The fiber optic transceiver module 10f configures the optical waveguide 20 so as to include the light receiving path 26 extended to the guide 13 from the side 14 of the block 11 in the shape of substantially straight line. Also the light receiving element (the photodiode) of the micro tile-like element 2 is allocated to the side 14 of the block 11 so as to face the end of the light receiving path 26.

As mentioned above, the fiber optic transceiver module 10f enables the light emitting element (the micro tile-like element 1) and the light receiving element (the micro tile-like element 2) to be coupled to the one optical fiber through the optical waveguide 20. The light emitted from the micro tile-like element 1 (a transmitting signal) is prevented from being entering the micro tile-like element 2 by the above-mentioned returned light blockage function. The light entering the main path 23 from the optical fiber side (a receiving signal) enters only the micro tile-like element 2 and also is prevented from entering the micro tile-like element 1 by the above-mentioned returned light blockage function.

As for the fiber optic transceiver module, when the receiving light, not only the above-mentioned returned light, reaches the transmitting element (a semiconductor laser and the like of the micro tile-like element 1), its movement may be unstable. Since the receiving signal passes back the optical waveguide 20 along the same path of the returned light as mentioned above, in a case where the returned light blocking function of the branch is functional enough to prevent the receiving light as well as the returned light from entering the emitting element, a problem, such as unstable movement, does not arise.

In the light receiving element (the micro tile-like element 2) shown in FIG. 7, there may be no way to block the light reflected (the returned light) from the end of the optic waveguide 20 and the end of the optical fiber. Thus, the returned light reaches the receiving element and causes noise. Though, in a case where the intensity of the light received is strong enough for the returned light, a problem, such as noise, does not arise.

Thus, this exemplary embodiment makes it possible to economically provide the fiber optic transceiver module that is capable of transmitting and receiving the light simultaneously through one optical fiber and is compact in size.

Also, exemplary embodiment enables the same wavelength light to employ for the transmitting light and receiving light. Since this exemplary embodiment enables the transmitting light and receiving light respectively one way (substantially without reflection light) in the optical waveguide 20 and the optical fiber to pass, no mixing between the transmitting element and the receiving element arises even though the same wavelength light is applied for the transmitting light and receiving light in one optical fiber. Applying different wavelengths laser beam for the transmitting light and receiving light respectively, an arrangement may avoid mixing between transmitting and receiving by the wave selectability employed in the light receiving element.

Examples of the light receiving element (a photodiode) included in the micro tile-like element 2 include a PIN photodiode, APD (an avalanche photodiode), and MSM (a metal-semiconductor-metal) photodiode, depending on its application. The APD provides high optical sensitivity and responsive frequency range. The MSM photodiode has a simple configuration and is easy to be integrated with an amplifier transistor.

In exemplary embodiments one through four described above, the alignment between the micro tile-like element 1, 2 and the end of the optical waveguide 20 may be done by adjusting the position of the micro tile-like element 1, 2 in two dimensions defined by the x and y axes on the side of the block 11. Therefore, in this exemplary embodiment, there is no need to make the alignment of a light emitting or receiving element in three dimensions defined by the x, y, and z axes, and to make the alignment by driving the light emitting or receiving element, which is the case with the related art module for optical communications. This makes it possible to make the alignment of the light emitting or receiving element easier and faster than related art methods.

In the block 11, the guide 13 and the optical waveguide 20 are provided so as to face an end of the core of the optical fiber that is inserted into the guide 13. The concave surface of the guide 13 may have a circular section, and its diameter may be almost the same as or a little greater than the diameter of the end of an optical fiber 60 including a clad. Moreover, the center of the core of the optical fiber that is inserted into the guide 13 is aligned to the center of the other end of the optical waveguide 20. This enables the optical waveguide 20 and the core 62 of the optical fiber 60 to be coupled with high optical coupling efficiency only by inserting an end of the optical fiber 60 into the guide 13. The core of the optical fiber and a light emitting or receiving element of the micro tile-like element 1 are coupled with high optical coupling efficiency only by inserting an end of the optical fiber into the guide 13.

Other Modifications

Figure 8:
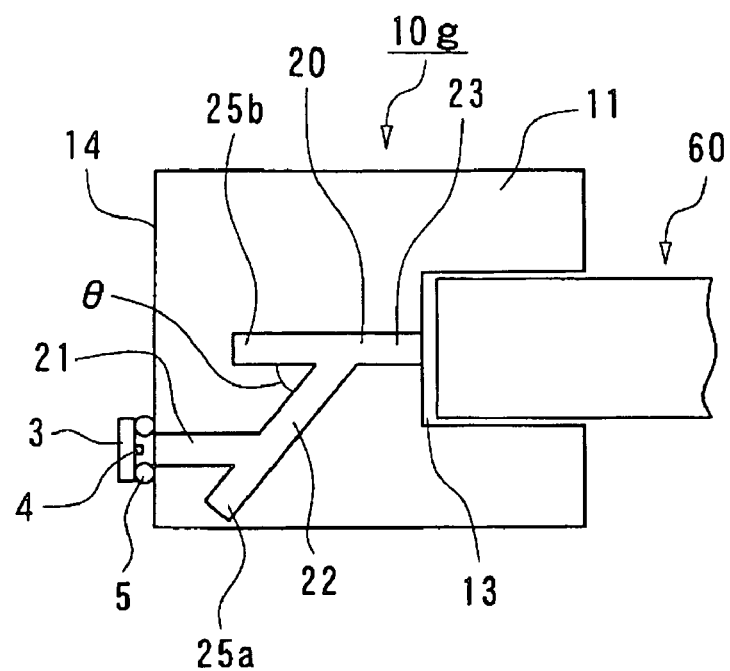
FIG. 8 is a sectional schematic showing another modification of the fourth exemplary embodiment of the invention.

The other modifications of the exemplary embodiments mentioned above will now be described by referring to FIGS. 8 to 10. FIG. 8 is a sectional schematic showing a modification of fiber optic transceiver module 10a shown in FIG. 1. In the exemplary embodiment mentioned above, to apply the flip-chip mounting on the block 11 for the light emitting element and light receiving element instead of the micro tile-like element is acceptable.

As for the fiber optic transceiver module 10g shown in FIG. 8, the light emitting element 4 that is flip-chip mounted on the side 14 of the block 11 is employed instead of the micro tile-like element 1 including the light emitting element. The light emitting element 4 is included in the integrated circuit chip 3. The integrated circuit chip 3 is flip-chip mounted on the side 14 of the block 11 via a bump 5.

Instead of the micro tile-like element 2 (a light receiving element, a PD) in the fiber optic transceiver module 10f shown in FIG. 7, the light receiving element (not illustrated) that is flip-chip mounted on the side 14 of the block 11 is also available.

Figure 9:
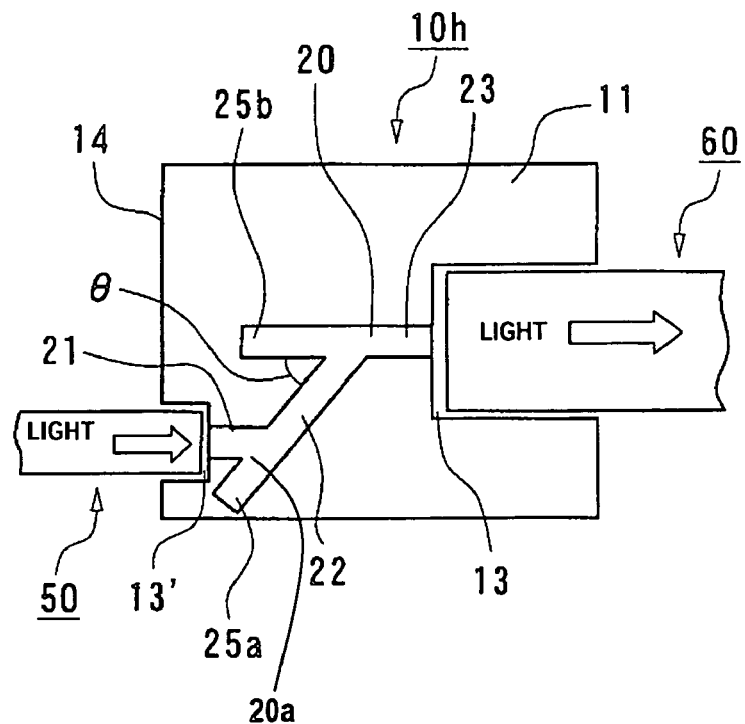
FIG. 9 is a sectional schematic showing another modification of the fourth exemplary embodiment of the invention.

FIG. 9 is a sectional schematic showing a modification of fiber optic transceiver module 10a shown in FIG. 1. As for the fiber optic transceiver module 10h, the optical fiber 50 is coupled to the block 11 instead of the micro tile-like element 1 (light emitting element) in the fiber optic transceiver module 10a shown in FIG. 1. Specifically, in the fiber optic transceiver module 10h, the guide 13' is provided at the side 14 of the block 11. The end of the optical fiber is inserted into the guide 13'. The position of the guide 13' may be adjusted by aligning the center on the bottom of the guide 13' close to the center of the other end 20a of the optical wave guide 20. For example, the end of the optical fiber 50 is inserted into the guide 13'.

The light transmitting to the right direction (shown by the arrow) in the core of the optical fiber 50 in FIG. 9 is emitted from the end of the optical fiber 50 and enters the optical waveguide 20 through guide 13'. The light is transmitted through the main path 21 in the optical waveguide 20 to enter the main path 22. Since the main path 21 connects and slants off the main path 22, there is no substantial returned light caused by the light entering the main path 22 from the main path 21 at the side of the main path 22.

Then, the light entering the main path 22 enters the main path 23, transmitting through the main path 22. Since the main path 22 connects and slants off the main path 23, there is no substantial returned light caused by the light entering the main path 23 from the main path 22 at the side of the main path 23. The light entering the main path 23 is transmitted to the other end 20b of the optical waveguide 20 through the main path 23, then exits and enters the core of the optical fiber 60 inserted into the guide 13.

As a result, this exemplary embodiment enables the optical fibers to be easily coupled together without returned light.

Figure 10:
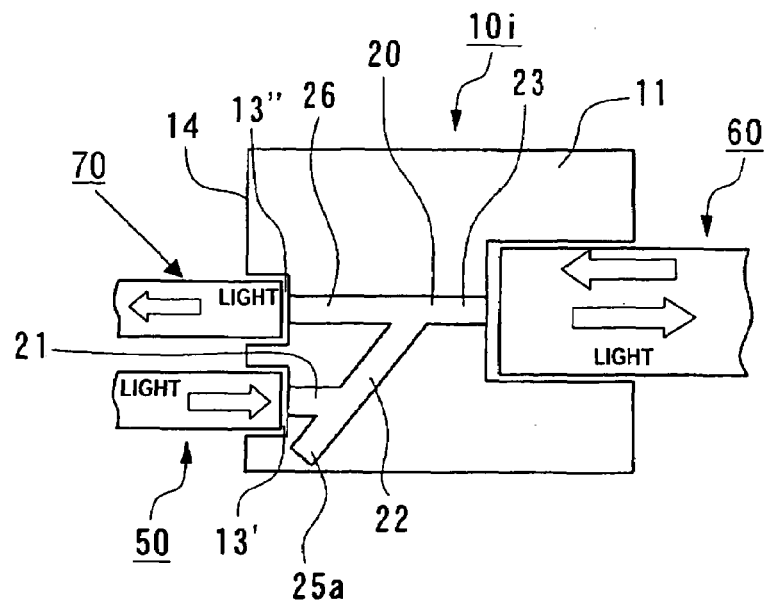
FIG. 10 is a sectional schematic showing another modification of the fourth exemplary embodiment of the invention.

FIG. 10 is a sectional schematic showing a modification of fiber optic transceiver module 10f shown in FIG. 7. As for the fiber optic transceiver module 10i, the optical fiber 50 is coupled to the block 11 instead of the micro tile-like element 1 (a light emitting element) in the fiber optic transceiver module 10f shown in FIG. 7. Furthermore, the optical fiber 70 is coupled to the block 11 instead of the micro tile-like element 2 (a light receiving element).

Specifically, in the fiber optic transceiver module 10i, the guide 13' is provided at the side 14 of the block 11. The end of the optical fiber is inserted into the guide 13'. The position of the guide 13' may be adjusted by aligning the center on the bottom of the guide 13' close to the center of the other end 20a of the optical wave guide 20. For example, the end of the optical fiber 50 is inserted into the guide 13'.

Further, in the fiber optic transceiver module 10i, the guide 13" is provided at the end of the receiving path 26 that is corresponds to the blind end of the branch 25b of the optical waveguide 20 in the fiber optic transceiver module 10a to 10e. The end of the optical fiber is inserted into the guide 13". The position of the guide 13" may be adjusted by aligning the center on the bottom of the guide 13" close to the center of the receiving path 26. For example, the end of the optical fiber 70 is inserted into the guide 13".

The light transmitting to the right direction in the core of the optical fiber 50 in FIG. 10 is emitted from the end of the optical fiber 50 and enters the optical waveguide 20 through the guide 13'. The light is transmitted in the main path 32 including optical waveguide 20 to enter the main path 22. Since the main path 21 connects and slants off the main path 22, there is no substantial returned light caused by reflecting the light entering the main path 22 from the main path 21 at the side of the main path 22.

Then, the light entering the main path 22 enters the main path 23, transmitting through the main path 22. Since the main path 22 connects and slants off the main path 23, there is no substantial returned light caused by reflecting the light entering the main path 23 from the main path 22 at the side of the main path 22. The light entering the main path 23 transmits to the other end 20b of the optical waveguide 20 through the main path 23, then exits and enters the core of the optical fiber 60 inserted into the guide 13.

Further, the light transmitting to the left direction in the FIG. 10 is emitted from the end of the optical fiber to enter the optical waveguide 20 through the guide 13. The light is transmitted through the receiving path 26 in the optical waveguide 20 to enter the core of the optical fiber 60 through the guide 13.

As a result, this exemplary embodiment enables the optical fiber 60 in which optical signals are bi-directionally transmitted in and the two optical fibers 50, 70 in which an optical signal is transmitted in one direction to easily couple together without returned light.

Manufacturing Methods

Figure 11:
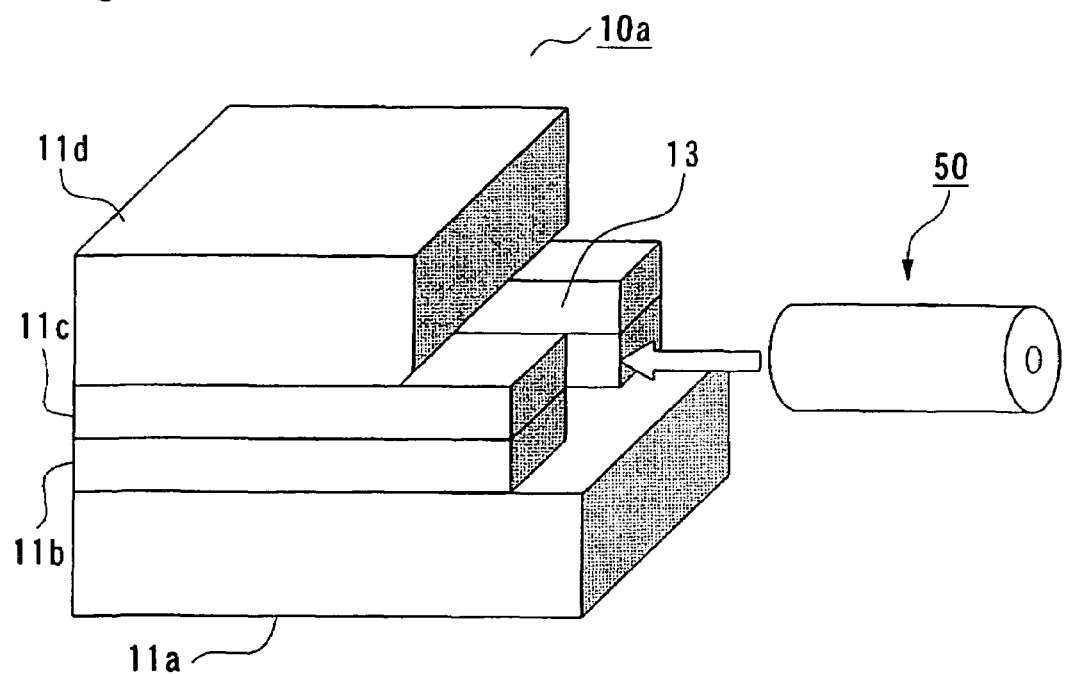
FIG. 11 is a schematic showing a method to manufacture the fiber optic transceiver module described in the exemplary embodiments of the invention.
Figure 12:
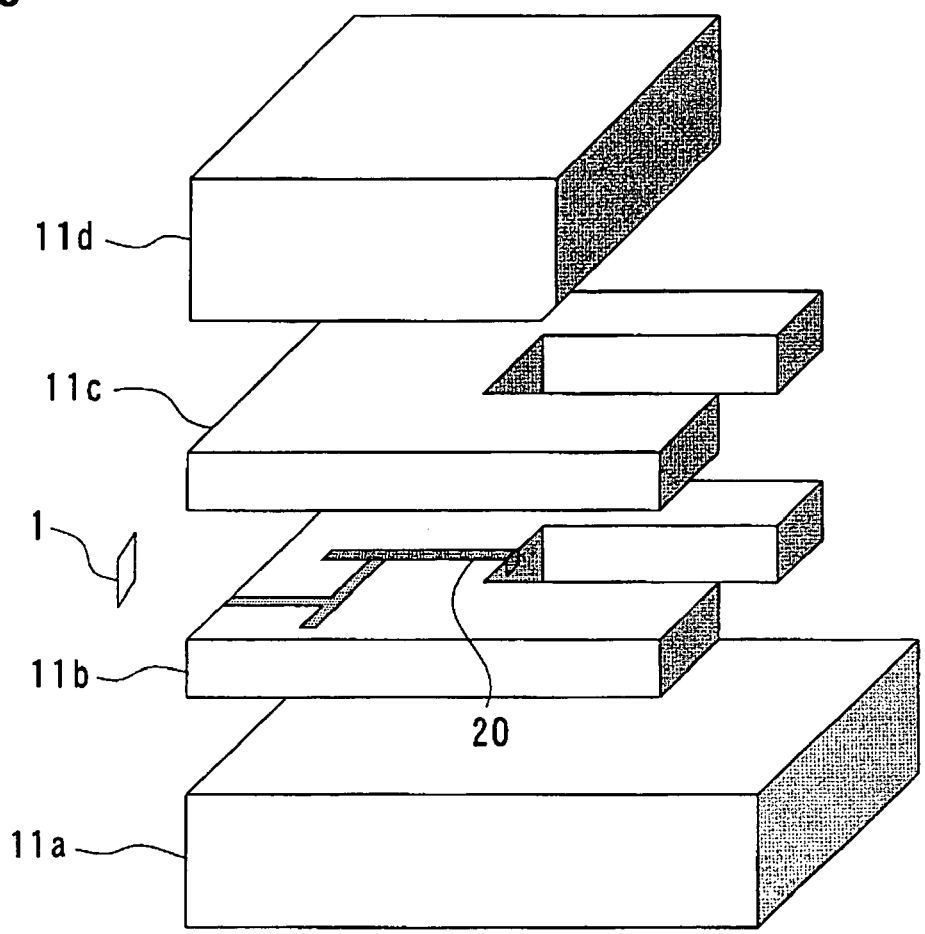
FIG. 12 is an exploded schematic of the fiber optic transceiver module.

A method to manufacture the fiber optic transceiver module described in the aforementioned exemplary embodiments will now be described by referring to FIGS. 1 to 18. FIG. 11 is a perspective view showing a plurality of plate members 11a, 11b, 11c, and 11d that are stacked to form the block 11 included in the fiber optic transceiver module 10a described in the exemplary embodiments. FIG. 12 is an exploded perspective view of the fiber optic transceiver module 10a shown in FIG. 11. FIG. 13a is a plan view showing the fiber optic transceiver module 10a shown in FIG. 11. FIG. 13b is a center section view and FIG. 13c is a front view of the fiber optic transceiver module 10a shown in FIG. 11.

As shown in these figures, the guide 13 of the fiber optic transceiver module 10a includes a concave part of the plate members 11b and 11c. The plate member 11b is provided with the optical waveguide 20. The optical waveguide 20 is square-pole-shaped and is buried in the plate member 11b so as to have the upper surface of the square pole as the upper surface of the plate member 11b. Here, the shape of the optical waveguide 20 is not limited to a square pole. It may be circular or an elliptic cylinder shape. The optical waveguide 20 may be provided so as to have the upper surface of the optical waveguide 20 as the upper surface of the plate member 11b. However, the optical waveguide 20 may be provided so as to penetrate the inside of the plate member 11b. Here, by providing the optical waveguide 20 so as to have the upper surface of the optical waveguide 20 as the upper surface of the plate member 11b, it becomes easier to form the optical waveguide 20.

Also, the optical waveguide 20 may be provided in the plate member 11c. Alternatively, the optical waveguide 20 may be formed in a way that has substantially one half of the optical waveguide 20 being buried in the plate member 11b and substantially the remainder in the plate member 11c. This makes it easy to form the optical waveguide 20 that is cylinder-shaped.

Figure 14:
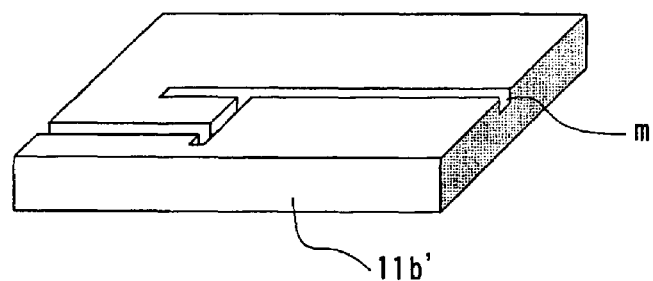
FIG. 14 is a schematic showing a first stage of a method to manufacture the fiber optic transceiver module.

A detailed method to manufacture the fiber optic transceiver module 10a shown in FIGS. 11 to 13 will now be described by referring to FIGS. 14 to 18. FIG. 14 is schematic showing a first stage of a method to manufacture the fiber optic transceiver module 10a. As shown in FIG. 14, a groove (indicated by "m" in the drawing) is first formed by etching or carving a plate 11b'. The plate 11b' having a groove "m" may be formed by using a stamper or injection molding.

The plate 11b' is a material of the plate member 11b.

Figure 15:
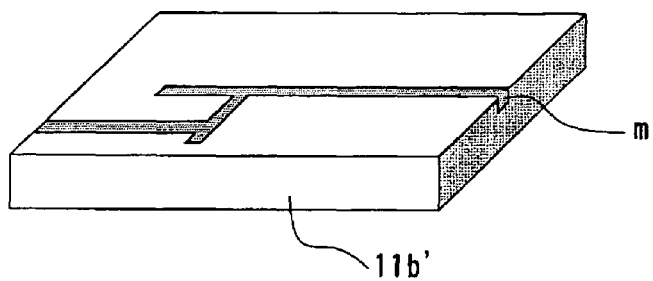
FIG. 15 is a schematic showing a second stage of a method to manufacture the fiber optic transceiver module.

FIG. 15 is a schematic showing a second stage of a method to manufacture the fiber optic transceiver module 10a. The groove "m" is filled with resin in this stage. For example, the groove "m" is filled with ultraviolet (UV) cured liquid resin, and then the resin is cured with exposure of UV rays.

The resin may be transparent and have a high refractive index, on one hand. However, the plate 11b' may have a low refractive index. The resin that fills the groove "m" is to be the optical waveguide 20.

Figure 16:
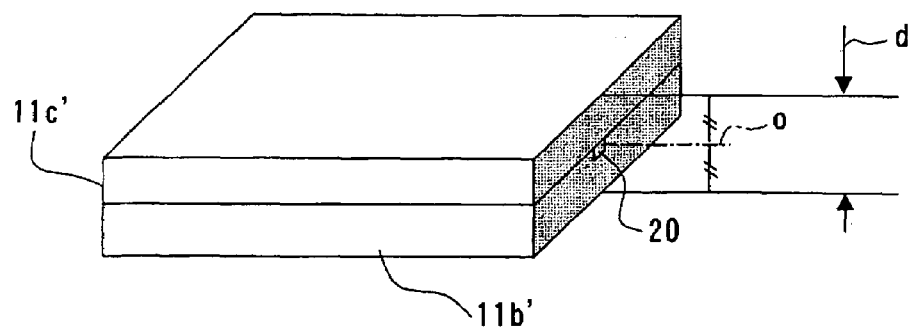
FIG. 16 is a schematic showing a third stage of a method to manufacture the fiber optic transceiver module.

FIG. 16 is a schematic showing a third stage of a method to manufacture the fiber optic transceiver module 10a. In this stage, a plate 11c' is attached on top of the plate 11b' that has been processed in the first and second stages. The plate 11c' is a material of the plate member 11c. The plate 11c' may have a low refractive index.

The thickness of the plates 11b' and 11c' meets the following requirements. First, the total thickness of the plates 11b' and 11c' is almost the same as or a little greater than the diameter of the optical fiber that is coupled to the fiber optic transceiver module 10a or the diameter of the tip of a ferrule (a part to support the optical fiber) that is attached to the end of the optical fiber. Second, since the optical waveguide 20 is formed by attaching the plate 11c' to the plate 11b' having the groove "m", the center (indicated by "O") of the optical waveguide 20 is may be aligned to the center of the total thickness (indicated by "d") of the plates 11b' and 11c'.

Figure 17:
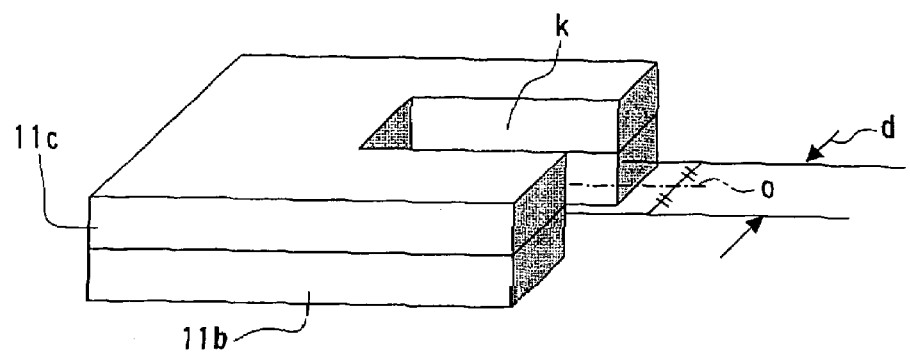
FIG. 17 is a schematic showing a fourth stage of a method to manufacture the fiber optic transceiver module.

FIG. 17 is a schematic showing a fourth stage of a method to manufacture the fiber optic transceiver module 10a. In this stage, the plates 11b' and 11c' are cut to form a cutting (indicated by "k") as shown in FIG. 17, and thereby the plate members 11b and 11c are formed. The cutting "k" is formed by cutting or laser processing. The width "d" of the cutting "k" is almost the same as or a little greater than the diameter of the optical fiber that is coupled to the fiber optic transceiver module 10a or the diameter of the tip of the ferrule.

The thickness "d" of the cutting "k" is almost the same as the total thickness "d" of the plate 11b' (the plate member 11b) and the plate 11c' (the plate member 11c) that is attached to the plate 11b'. Here, the width of the cutting "k" may be extended to the open end in a tapered shape. Alternatively, edges of the open end of the cutting "k" may be cut off. In this way, it becomes easy to insert the optical fiber 20 into the guide 13 formed by the cutting "k". Also, the cutting "k" is formed so as to align the center "O" of the cutting "k" to the center "O" of the optical waveguide 20 shown in FIG. 16. The bottom of the cutting "k" is made flat.

Figure 18:
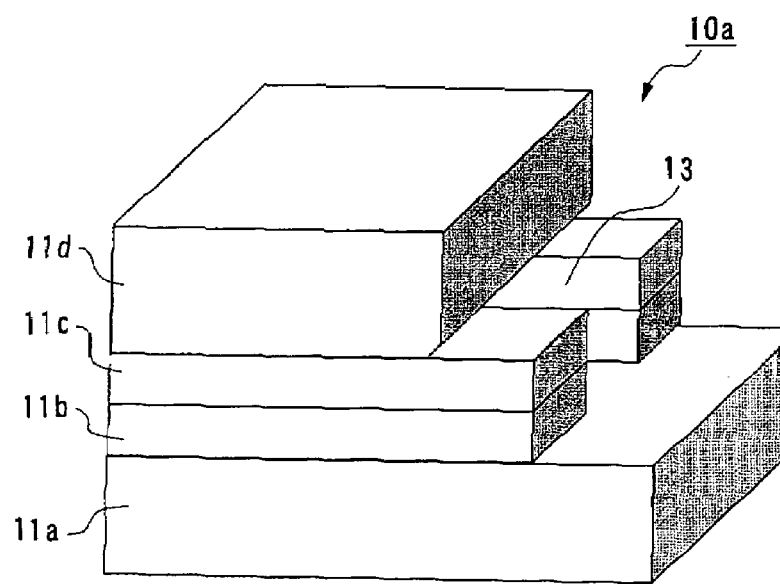
FIG. 18 is a schematic showing a fifth stage of a method to manufacture the fiber optic transceiver module.

FIG. 18 is a schematic showing a fifth stage of a method to manufacture the fiber optic transceiver module 10a. In this stage, the plate member 11a that is a flat plate is attached to the bottom of the plate member 11b and the plate member 11d that is a flat plate is attached on top of the plate member 11c, as shown in FIG. 16. Here, the right side of the plate member 11a may protrude from the end of the cutting "k" formed in the plate members 11b and 11c. Also, the right side of the plate member 11d may be recessed from the end of the cutting "k" formed in the plate members 11b and 11c. Edges of the plate member 11d facing the cutting "k" may be cut off. This makes it easier to insert the optical fiber into the guide 13 formed by the cutting "k".

Thus the block 11 having the optical waveguide 20 included in the fiber optic transceiver module 10a is formed. Subsequently, the micro tile-like element 1 is attached to a predetermined position of the block 11, which completes the fiber optic transceiver module 10, shown in FIG. 1.

According to this manufacturing method, it is possible to provide the optical waveguide 20 at the block 11 without perforation by combining the plurality of plate members 11a, 11b, 11c, and 11d. The waveguide 20 includes the branches 25a, 25b having a blind end. Hence, the fiber optic transceiver module 10a that enables the returned light to effectively reduce is easily manufactured.

Also, the fiber optic transceiver module 10a, which optically couples the optical fiber and a light emitting or receiving element of the micro tile-like element 1 attached to a predetermined position of the block 11 with high efficiency, is easily manufactured by inserting an end of the optical fiber into the guide 13 included in the block 11.

While the plate members 11b and 11c are formed by making the cutting "k" in the plates 11b' and 11c' at a later stage in the process, the optical waveguide 20 and the plate members 11b and 11c having the cutting "k" may be formed in one stage by injection molding, for example.

Additionally, the manufacturing method mentioned above enables the fiber optic transceiver module 10b, 10c, 10d, 10e, 10f, 10g, 10h, 10i, in the exemplary embodiments mentioned above to manufacture.

Method for Manufacturing Micro Tile-Like Element

A method to manufacture the micro tile-like element 1,2 having a light emitting element or a light receiving element and a method to attach the micro tile-like element 1,2 to the block 11 (a final substrate) will now be described by referring to FIGS. 19 to 28. This manufacturing method is based on the epitaxial lift-off method. While an example in which a compound semiconductor device (a compound semiconductor element) as the micro tile-like element is attached on the block 11 that is a final substrate will be described here, the invention can be applied to the block 11 of any type and form. Also in this exemplary embodiment, while "a semiconductor substrate" refers to a substance made of a semiconductor material, the semiconductor substrate is not limited to this and includes any semiconductor materials irrespective of their forms.

First Stage

Figure 19:
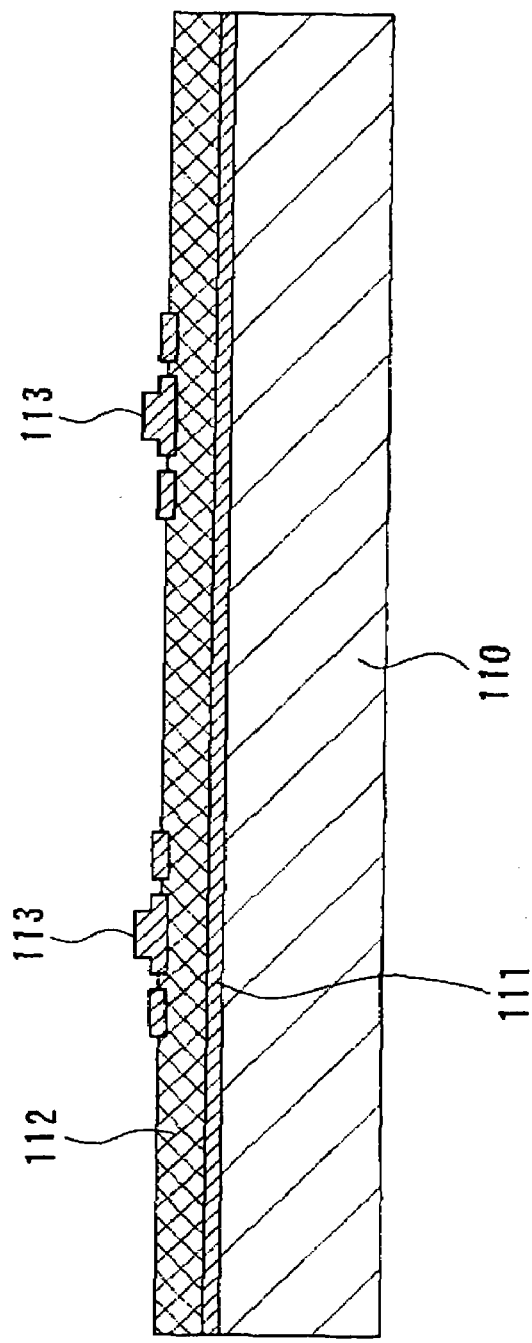
FIG. 19 is a sectional schematic showing a first stage of a method to manufacture the micro tile-like element described in the embodiments.

FIG. 19 is a sectional schematic showing a first stage of a method to manufacture the micro tile-like element.

Referring to FIG. 19, a substrate 110 is a semiconductor substrate, for example, a GaAs compound semiconductor substrate. The bottom layer on the substrate 110 is a sacrificial layer 111. The sacrificial layer 111 may be made of AlAs and is, for example, several hundred nanometers deep.

On the sacrificial layer 111, a functional layer 112 is deposited, for example. The functional layer 112 is, for example, 1 to 10 (20) micrometers deep. On the functional layer 112, a semiconductor device (e.g. a surface emitting laser) 113 is formed. Examples of the semiconductor device 113 include a surface emitting laser (VCSEL) and a driver circuit or APC circuit using other function elements, such as a phototransistor (PD), a high electron mobility transistor (HEMT), and a heterobipolar transistor (HBT). The semiconductor device 113 is formed by an element composed of multiple epitaxial layers on the substrate 110. The semiconductor device 113 is also provided with an electrode and undergoes operational testing.

Second Stage

Figure 20:
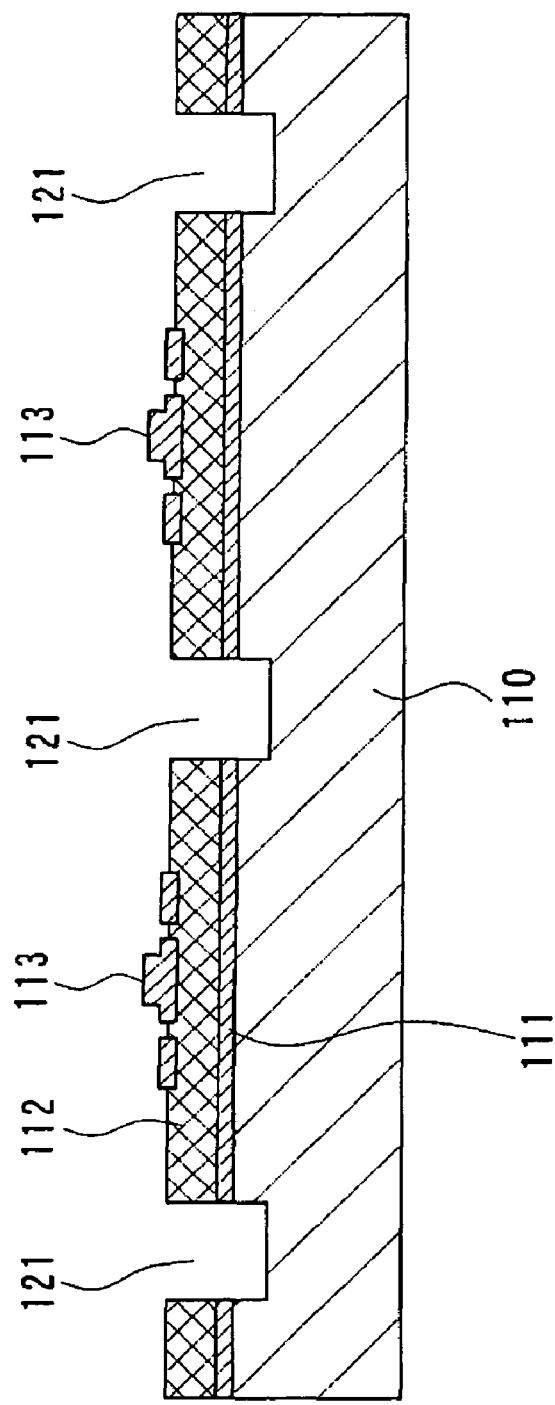
FIG. 20 is a perspective schematic showing a second stage of a method to manufacture the micro tile-like element.

FIG. 20 is a sectional schematic showing a second stage of a method to manufacture the micro tile-like element.

In this stage, a separate trench 121 is formed so as to separate the semiconductor device 113 from another semiconductor device. The separate trench 121 is deep enough to at least reach the sacrificial layer 111. For example, the separate trench is ten to several hundred micrometers wide and deep. Also, the separate trench 121 extends without interruption so that a selective etching liquid, that is described in detail later, flows to it. The separate trench 121 may be preferably arranged in a grid.

By making an interval between the separate trench 121 and another separate trench from several dozen to several hundred micrometers, the size of the semiconductor device 113 that is separated by the separate trench 121 is set between several dozen to several hundred square micrometers. The separate trench 121 is formed by photolithography and the method using wet etching or dry etching. The separate trench 121 may be formed by dicing of a U-shaped trench, as long as a crack does not occur on the substrate.

Third Stage

Figure 21:
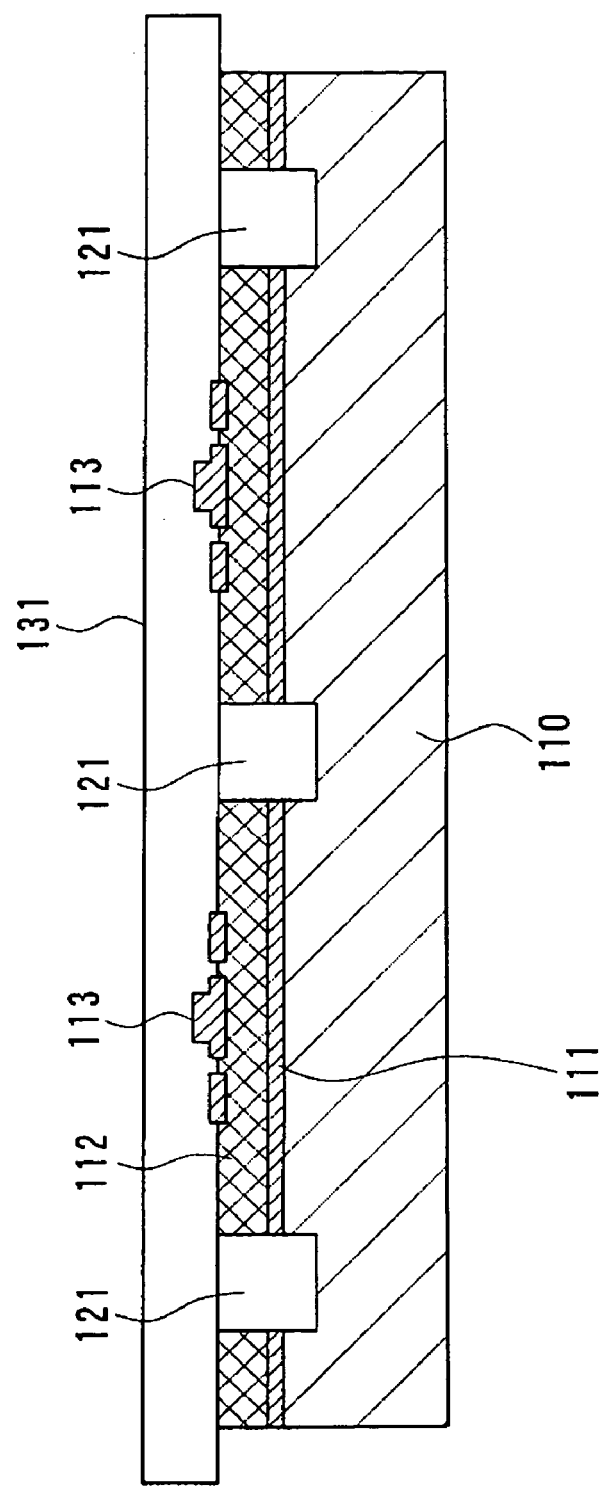
FIG. 21 is a schematic showing a third stage of a method to manufacture the micro tile-like element.

FIG. 21 is a sectional schematic showing a third stage of a method to manufacture the micro tile-like element.

In this stage, an intermediate transfer film 131 is disposed on the surface of the substrate 110 (on the side of the semiconductor device 113). The intermediate transfer film 131 is a flexible film on which an adhesive is applied.

Fourth Stage

Figure 22:
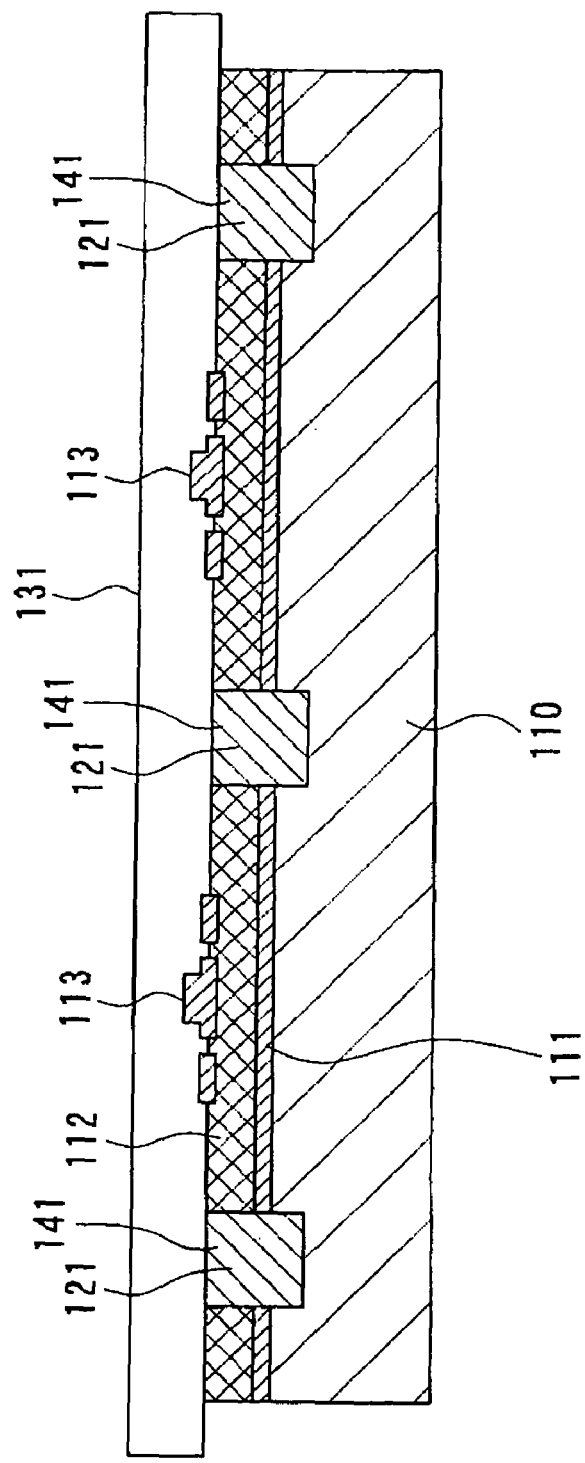
FIG. 22 is a schematic showing a fourth stage of a method to manufacture the micro tile-like element.

FIG. 22 is a sectional schematic showing a fourth stage of a method to manufacture the micro tile-like element.

In this stage, a selective etching liquid 141 is injected into the separate trench 121. Here, in order to selectively etch the sacrificial layer 111, low levels of hydrochloric acid, which is highly selective for aluminum and arsenic, are used as the selective etching liquid 141.

Fifth Stage

Figure 23:
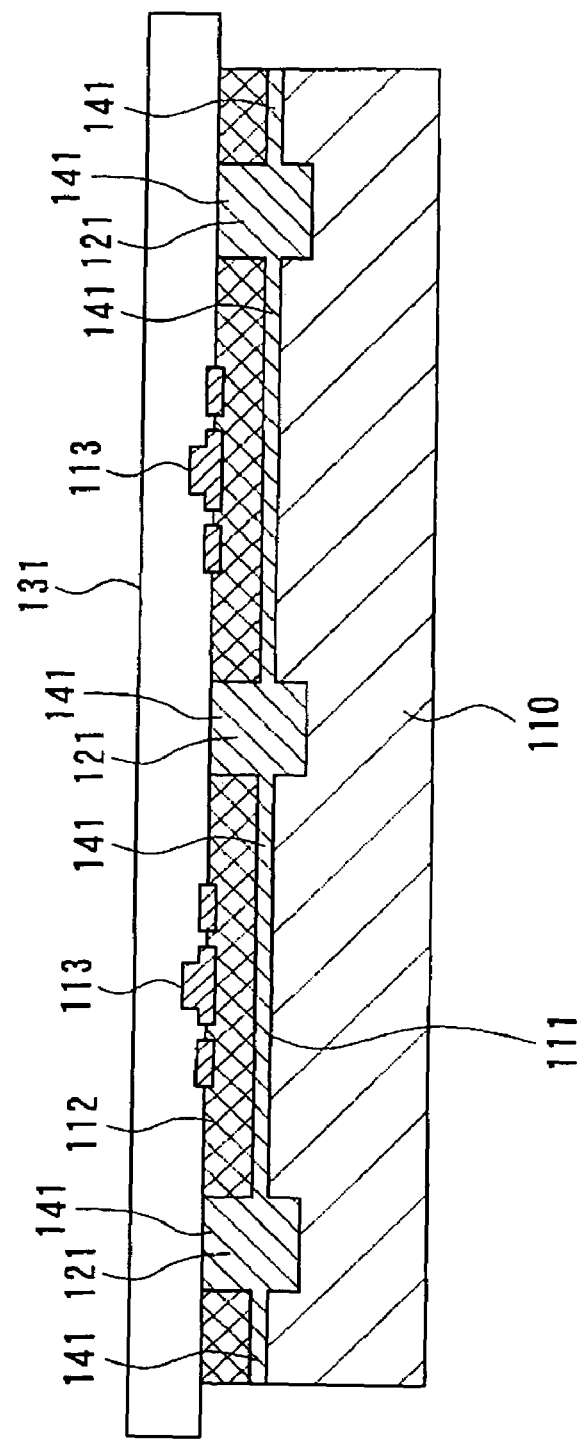
FIG. 23 is a schematic showing a fifth stage of a method to manufacture the micro tile-like element.

FIG. 23 is a sectional schematic showing a fifth stage of a method to manufacture the micro tile-like element.

In this stage, when a predetermined period of time elapses after injecting the selective etching liquid 141 into the separate trench 121 in the fourth stage, the sacrificial layer 111 is selectively etched and then removed from the substrate 110.

Sixth Stage

Figure 24:
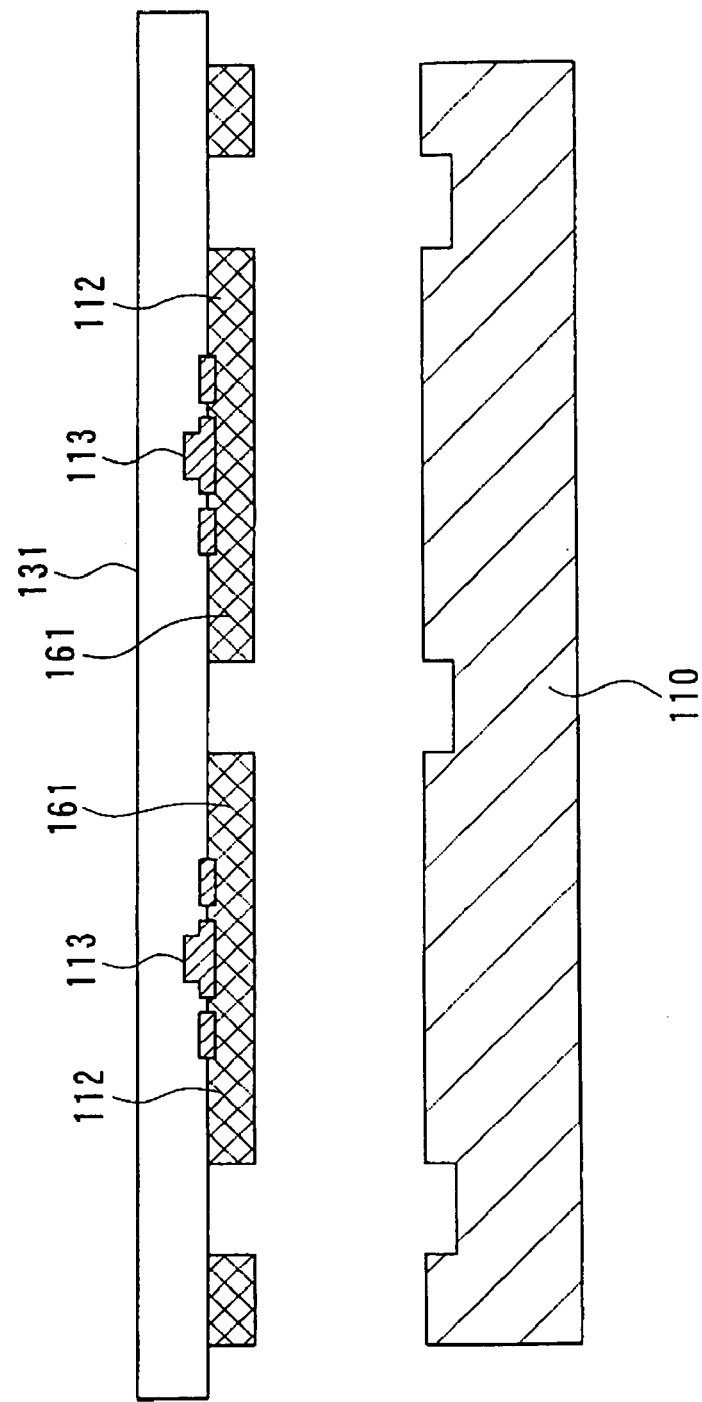
FIG. 24 is a schematic showing a sixth stage of a method to manufacture the micro tile-like element.

FIG. 24 is a sectional schematic showing a sixth stage of a method to manufacture the micro tile-like element.

The sacrificial layer 111 is etched in the fifth stage, the functional layer 112 is separated from the substrate 110. Subsequently, the intermediate transfer film 131 is separated from the substrate 110, and thereby the functional layer 112 adhering to the intermediate transfer film 131 is separated from the substrate 110 in this stage.

Thus, the functional layer 112, on which the semiconductor device 113 is formed, is separated through the forming of the separate trench 121 and etching of the sacrificial layer 111. Thereby, a micro tile-like element 161 (corresponding to the micro tile-like element 1 in the above-mentioned exemplary embodiments) of a predetermined form (e.g., a tile-like form) is formed and attached to the intermediate transfer film 131. Here, the functional layer may be 1 to 10 micrometers deep and several dozen to several hundred micrometers long and wide, for example.

Seventh Stage

Figure 25:
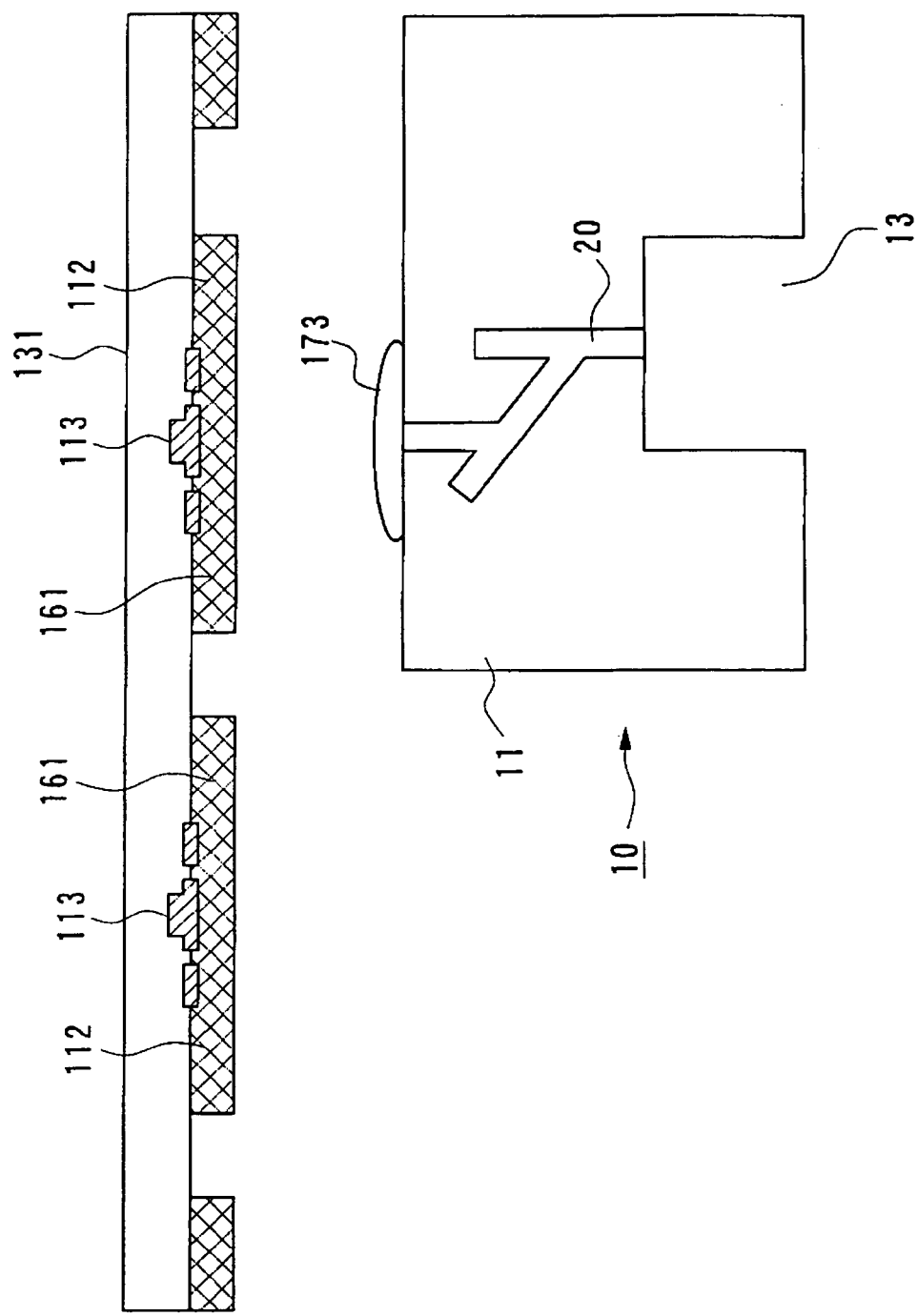
FIG. 25 is a schematic showing a seventh stage of a method to manufacture the micro tile-like element.

FIG. 25 is a sectional schematic showing a seventh stage of a method to manufacture the micro tile-like element.

In this stage, by moving the intermediate transfer film 131, to which the micro tile-like element 161 is attached, the micro tile-like element 161 is aligned to an intended position on the block 11 that is a final substrate. On the intended position on the block 11, an adhesive 173 is applied to retain the micro tile-like element 161. Alternatively, an adhesive is applied to the micro tile-like element 161.

Eighth Stage

Figure 26:
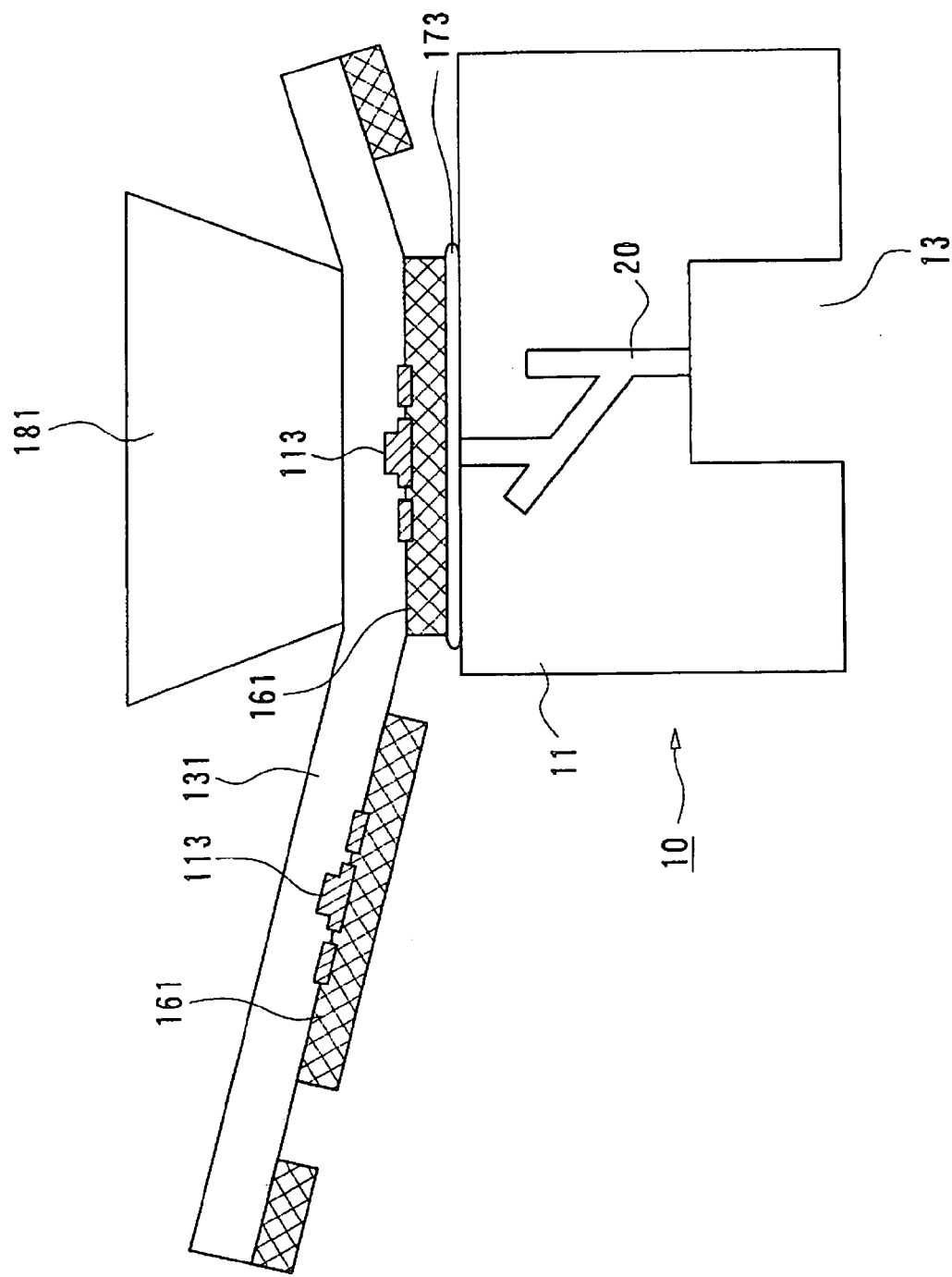
FIG. 26 is a perspective schematic showing an eighth stage of a method to manufacture the micro tile-like element.

FIG. 26 is a sectional schematic showing an eighth stage of a method to manufacture the micro tile-like element.

In this stage, the micro tile-like element 161 that is aligned to an intended position on the block 11 is pressed with a back pressing pin 181 via the intermediate transfer film 131 and joined to the block 11. Since the adhesive 173 is applied on the intended position, the micro tile-like element 161 is joined to the intended position on the block 11.

Ninth Stage

Figure 27:
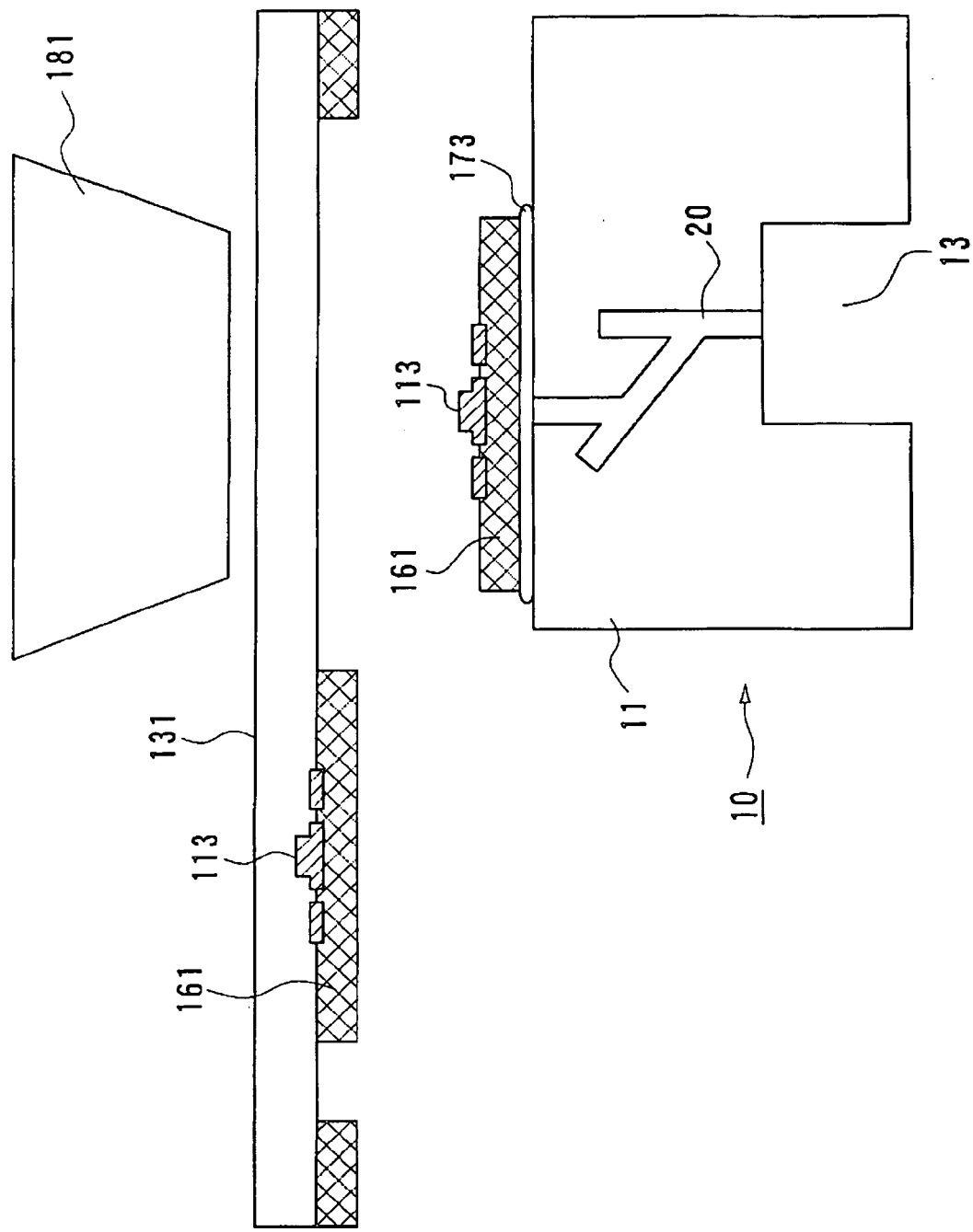
FIG. 27 is a schematic showing a ninth stage of a method to manufacture the micro tile-like element.

FIG. 27 is a schematic showing a ninth stage of a method to manufacture the fiber optic transceiver module. In this stage, by making the intermediate transfer film 131 lose adhesion, the intermediate transfer film 131 is separated from the micro tile-like element 161.

The intermediate transfer film 131 is provided with a UV cure or thermosetting adhesive. When using a UV cure adhesive, the back pressing pin 181 used here is made of a transparent material. By exposing the back pressing pin 181 to UV rays from its end, the intermediate transfer film 131 loses adhesion. When using a thermosetting adhesive, the same effect is obtained by heating the back pressing pin 181. Alternatively, the intermediate transfer film 131 also loses adhesion by being exposed to UV rays on its entire surface after the sixth stage. Here, while the intermediate transfer film 131 loses adhesion, it still maintains adhesion that is strong enough to retain the micro tile-like element 161, which is thin and light, on the intermediate transfer film 131.

Tenth Stage

This stage is not illustrated in the accompanying drawings. In this stage, the micro tile-like element 161 is firmly joined to the block 11 by heat treatment.

Eleventh Stage

Figure 28:
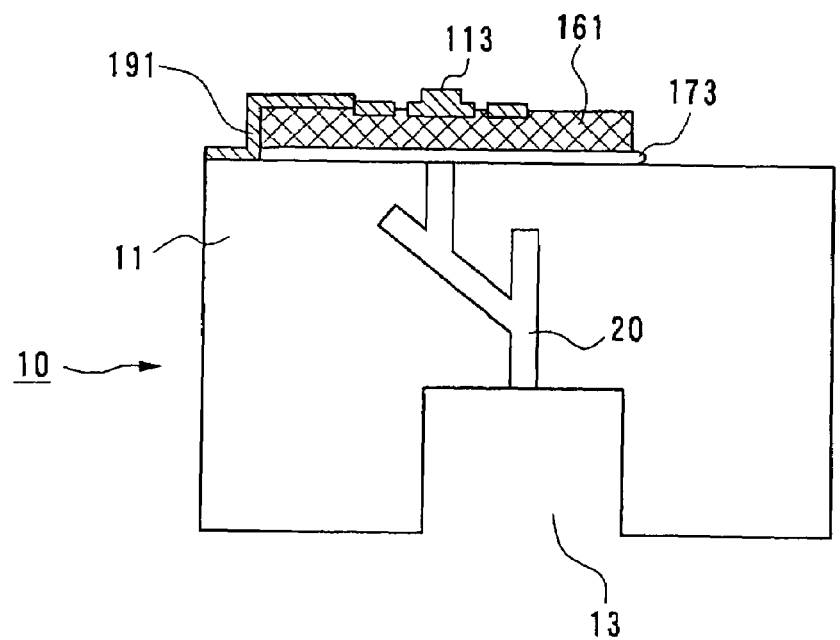
FIG. 28 is a schematic showing an eleventh stage of a method to manufacture the micro tile-like element.
Figure 29:
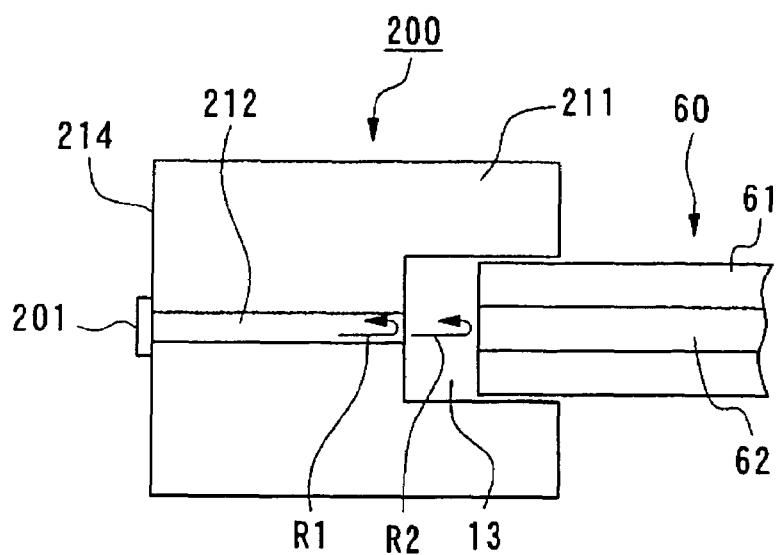
FIG. 29 is a schematic showing a returned light of the fiber optic transceiver module.

FIG. 28 is a sectional schematic showing an eleventh stage of a method to manufacture the micro tile-like element. In this stage, an electrode of the micro tile-like element 161 (a light emitting or receiving element) and a circuit on the block 11 are electrically coupled by a wiring 191, which completes the fiber optic transceiver module 10.

As a result, it is possible to form a semiconductor element forming a surface emitting laser etc. on a substrate that is made of a material different from that of the semiconductor element. For example, even if the block 11 as a final substrate 171 is made of glass or plastic, it is possible to form the micro tile-like element 161 having a GaAs surface emitting laser on an intended position on the block 11. This method also enables the selection of a surface emitting laser etc. through testing before forming a fiber optic transceiver module, since the separation in a micro tile-like form comes after the forming of the surface emitting laser etc. on a semiconductor substrate.

Also with this manufacturing method, only the functional layer having a semiconductor element (a light emitting or receiving element) is separated as a micro tile-like element from a semiconductor substrate and mounted on a film. Therefore, it is possible to selectively join the light emitting or receiving element to the block 11, and thereby to make the light emitting or receiving element smaller compared to one that is manufactured by related art mounting. As a result, it is possible to easily and economically form the fiber optic transceiver module 10 that receives and emits laser beams of an intended amount and state and is compact in size.

Electronic Equipment

Examples of electronic equipment having the fiber optic transceiver module described in the above-mentioned exemplary embodiments will now be described. The fiber optic transceiver modules in the above mentioned exemplary embodiments are applicable for electronic equipment, such as optical communication equipments, media converter, and optical transceiver.

Additionally, the fiber optic transceiver modules in the above-mentioned exemplary embodiments are applicable for portable information processors, such as a cellular phone, a wristwatch electronic equipment, a word processor, a computer.

The electronic equipments that include the fiber optic transceiver module described in the above-mentioned exemplary embodiments, they operate at high speeds utilizing optical signals, and can be manufactured economically.

It should be noted that the technical range of this invention is not limited to the above-mentioned exemplary embodiments. While this invention has been described in terms of several exemplary embodiments specifying materials and layer configuration, there are alterations and equivalents which fall within the scope of this invention.

For example, while the micro tile-like element 1,2 includes a light emitting element or a light receiving element in the above-mentioned exemplary embodiments, the application of the invention is not limited to this. A flip-chip element may replace the micro tile-like element 1,2.

While an optical fiber with a ferrule is inserted into the guide 13 in the exemplary embodiments, it is also possibly to directly insert an optical fiber into the guide 13 by appropriately setting the size of the guide 13.

Alternatively, a generic sleeve may be preferably used depending on specifications of a fiber connector. In this case, it is possible to join the sleeve to the guide 13 whose size is appropriate for directly receiving the sleeve in part and automatically setting its central axis. A generic sleeve may replace the guide 13 here. In this case, the central axis of the sleeve is preferably aligned to the end of the optical waveguide 20.

What is claimed is:

1. A fiber optic transceiver module, comprising:
    a block including an optical waveguide including a branch having a blind end and a concave guide into which an optical fiber is inserted and provided to at least one end of the optical waveguide; and
    an optical element with a light emitting or receiving surface attached to an outside surface of the block,
    the optical element being a light emitting device or a light receiving device, the light emitting or receiving surface being disposed so as to face the other end of the optical waveguide.

2. The fiber optic transceiver module according to claim 1, the optical element being employed in a tile-like element.

3. The fiber optic transceiver module according to claim 1, the optical element bring flip-chip mounted on the block.

4. The fiber optic transceiver module according to claim 1, the optical element being a optical fiber.

5. The fiber optic transceiver module according to claim 1, the optical element being a surface emitting laser.

6. The fiber optic transceiver module according to claim 1, the optical waveguide including a main path extending to the guide from the light emitting device and the branch, the branch being connected to the main path and aligned at an angle of ninety (90) degrees and below with respect to a light source side of the main path.

7. The fiber optic transceiver module according to claim 6, the branch being connected to the main path at an angle of forty five (45) degrees and below with respect to the path positioned at the light source side of the main path.

8. The fiber optic transceiver module according to claim 6, the branch being provided with two or more paths.

9. The fiber optic transceiver module according to claim 1, the blind end of the branch being configured so as to attenuate or absorb light entering the blind end.

10. The fiber optic transceiver module according to claim 1, the blind end of the branch being tapered at the edge of the blind end.

11. The fiber optic transceiver module according to claim 1, the blind end of the branch including an optical absorber at the edge of the blind end.

12. The fiber optic transceiver module according to claim 1, the blind end of the branch including an optical light scattering member at the edge of the blind end.

13. The fiber optic transceiver module according to claim 1,
the optical waveguide including a plurality of main forked paths each having one end exposed at a side of the block, and
the light emitting device including a plurality of light emitting devices, each of the plurality of the light emitting devices being allocated to the side of the block so as to face each of the end of the forked main paths correspondingly, each of the plurality of the light emitting devices emitting light having different wavelength from each other.

14. The fiber optic transceiver module according to claim 1, the light receiving device being allocated to at least one of the blind end of the optical waveguide.

15. The fiber optic transceiver module according to claim 1, the optical waveguide including a light receiving path extended to the guide from a side of the block in a shape of substantially a straight line, the light receiving device being allocated to a side of the block so as to face an end of the receiving path.

16. The fiber optic transceiver module according to claim 1, the light receiving device being a photodiode.

17. Electronic equipment, comprising:
the fiber optic transceiver module according to claim 1.

18. A fiber optic transceiver module, comprising:
a block including an optical waveguide including a branch having a blind end and a concave guide into which an optical fiber is inserted and provided to at least one end of the optical waveguide, the branch being provided with two or more paths; and
an optical element with a light emitting or receiving surface attached on the block by an adhesive,
the optical element being a light emitting device or a light receiving device,
the light emitting or receiving surface being disposed so as to face the other end of the optical waveguide.

19. A fiber optic transceiver module, comprising:
a block including an optical waveguide including a branch having a blind end and a concave guide into which an optical fiber is inserted; and
an optical element with a light emitting or receiving surface attached to the block,
one end of the optical waveguide being exposed to a bottom of the guide and an other end of the optical waveguide being exposed on a side face of the block,
the optical element being a light emitting device or a light receiving device,
the light emitting or receiving surface being disposed on a position of the side face of the block where the other end of the optical waveguide is exposed.

* * * * *